United States Patent
Hayakawa

(10) Patent No.: US 11,027,723 B2
(45) Date of Patent: Jun. 8, 2021

(54) PARKING SUPPORT METHOD AND PARKING SUPPORT DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 328 days.

(21) Appl. No.: 15/769,035

(22) PCT Filed: Oct. 22, 2015

(86) PCT No.: PCT/JP2015/079892
§ 371 (c)(1),
(2) Date: Apr. 17, 2018

(87) PCT Pub. No.: WO2017/068698
PCT Pub. Date: Apr. 27, 2017

(65) Prior Publication Data
US 2020/0062242 A1    Feb. 27, 2020

(51) Int. Cl.
*B60W 30/06* (2006.01)
*B60W 50/14* (2020.01)
(Continued)

(52) U.S. Cl.
CPC ............ *B60W 30/06* (2013.01); *B60W 50/14* (2013.01); *B62D 15/0285* (2013.01); *G06K 9/00812* (2013.01); *G08G 1/143* (2013.01); *B60W 2050/146* (2013.01); *B60W 2420/42* (2013.01); *B60W 2554/00* (2020.02)

(58) Field of Classification Search
CPC .... B60W 30/06; G08G 1/143; G06K 9/00812
See application file for complete search history.

(56) References Cited

U.S. PATENT DOCUMENTS 8,232,893 B2 * 7/2012 Endo .................. G08G 1/166
340/908
2008/0266139 A1   10/2008 Kim
(Continued)

FOREIGN PATENT DOCUMENTS

CN        101878494 B    6/2013
DE      102007002261    *  8/2008
(Continued)

OTHER PUBLICATIONS

DE102007002261, Bonne UWE, Aug. 2, 2008, Machine translation.*
(Continued)

*Primary Examiner* — Anne Marie Antonucci
*Assistant Examiner* — Abdalla A Khaled
(74) *Attorney, Agent, or Firm* — Young Basile Hanlon & MacFarlane, P.C.

(57) ABSTRACT

A method of displaying parking assist information is used in a parking assist apparatus comprising a display and a control device. The control device detects a first parking space that satisfies a predefined parking condition. When information of selecting a second parking space other than the first parking space is input, the control device re-detects a parking space that satisfies the predefined parking condition as the first parking space.

15 Claims, 16 Drawing Sheets

(51) Int. Cl.
*B62D 15/02* (2006.01)
*G06K 9/00* (2006.01)
*G08G 1/14* (2006.01)

(56) References Cited

U.S. PATENT DOCUMENTS

| | | | |
|---|---|---|---|
| 2009/0118900 A1 | 5/2009 | Adachi et al. | |
| 2010/0274446 A1 | 10/2010 | Sasajima et al. | |
| 2014/0111647 A1 | 4/2014 | Atsmon et al. | |
| 2015/0097705 A1* | 4/2015 | Torii | G08G 1/168 340/932.2 |
| 2016/0284217 A1* | 9/2016 | Lee | B62D 15/0285 |
| 2016/0371551 A1 | 12/2016 | Atsmon et al. | |

FOREIGN PATENT DOCUMENTS

| | | | |
|---|---|---|---|
| JP | 2006306233 | * | 11/2006 |
| JP | 2007-076469 A | | 3/2007 |
| JP | 2007-076496 A | | 3/2007 |
| JP | 2008-096362 A | | 4/2008 |
| JP | 2009205191 A | | 9/2009 |
| JP | 2011-218863 A | | 11/2011 |
| JP | 2014101101 | * | 6/2014 |
| JP | 2015-74255 A | | 4/2015 |
| JP | 2015-153145 A | | 8/2015 |
| RU | 97312 U1 | | 9/2010 |
| RU | 2529078 C2 | | 9/2014 |
| WO | 2007058325 A1 | | 5/2007 |
| WO | 2012150591 A2 | | 11/2012 |

OTHER PUBLICATIONS

JP2014101101, Akiyama Keiko, Jun. 5, 2014, Machine translation,.*

JP2006306233, Hattori Toshihiro, Nov. 9, 2006, Machine translation.*

* cited by examiner

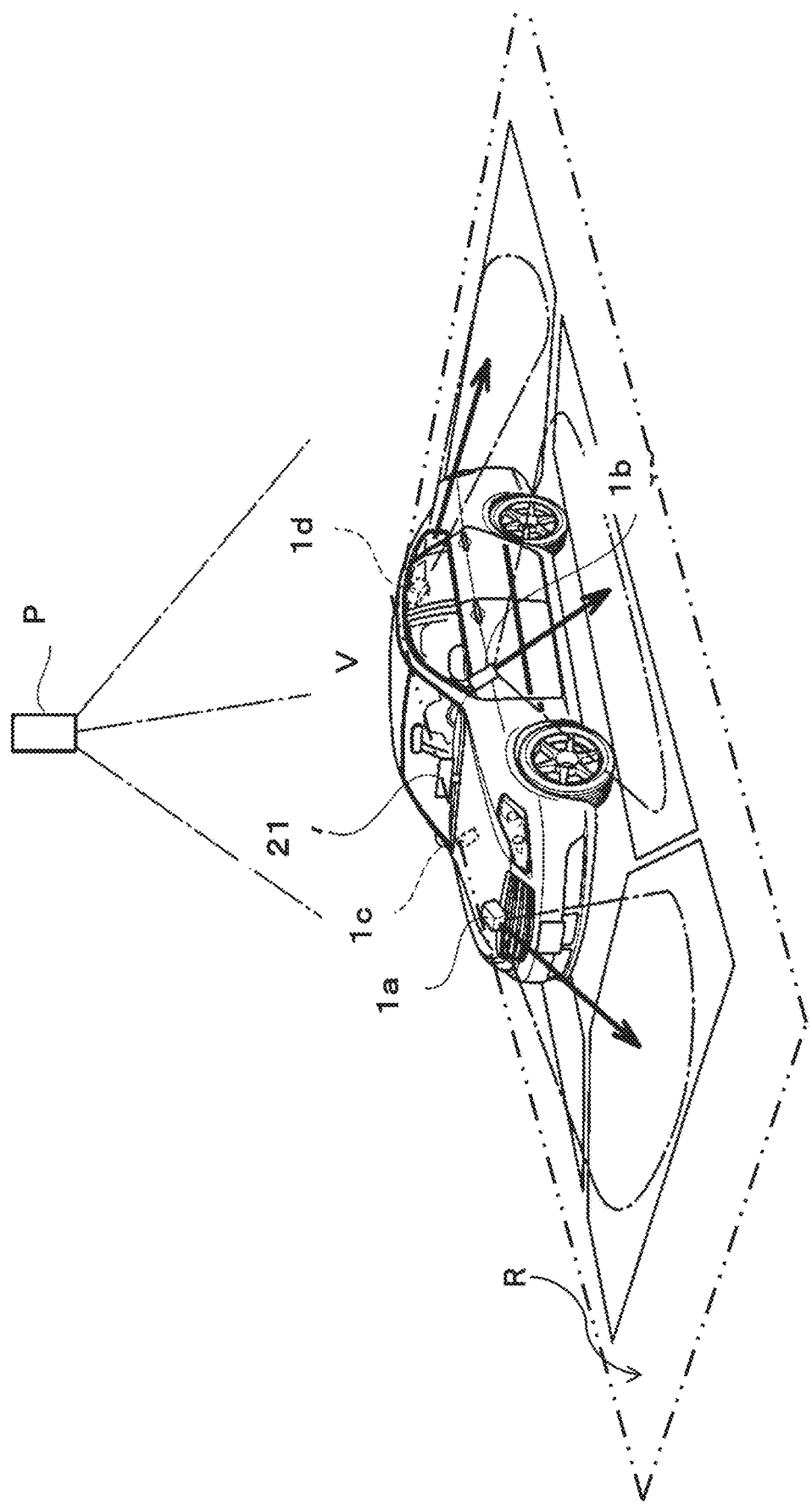

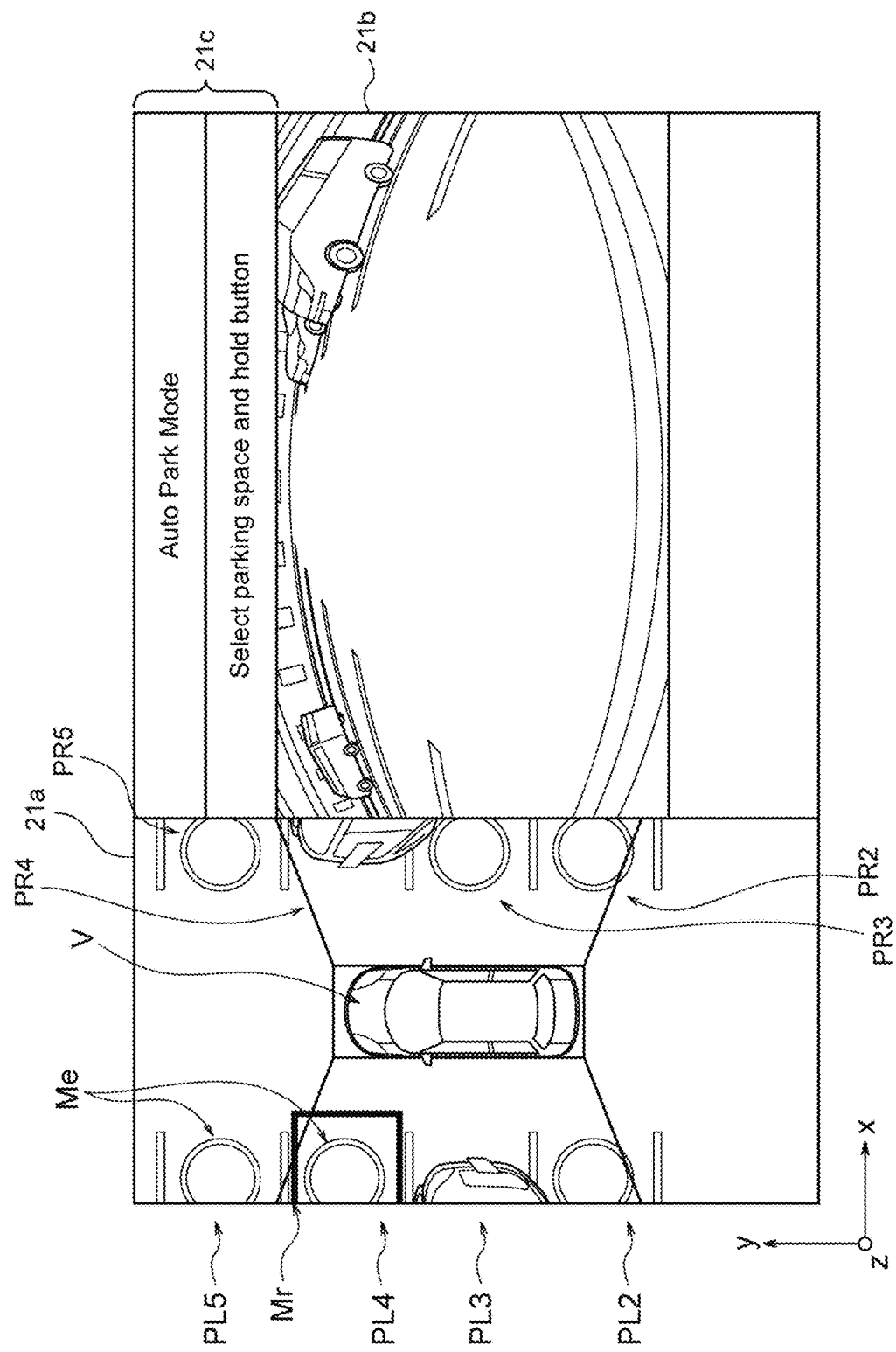

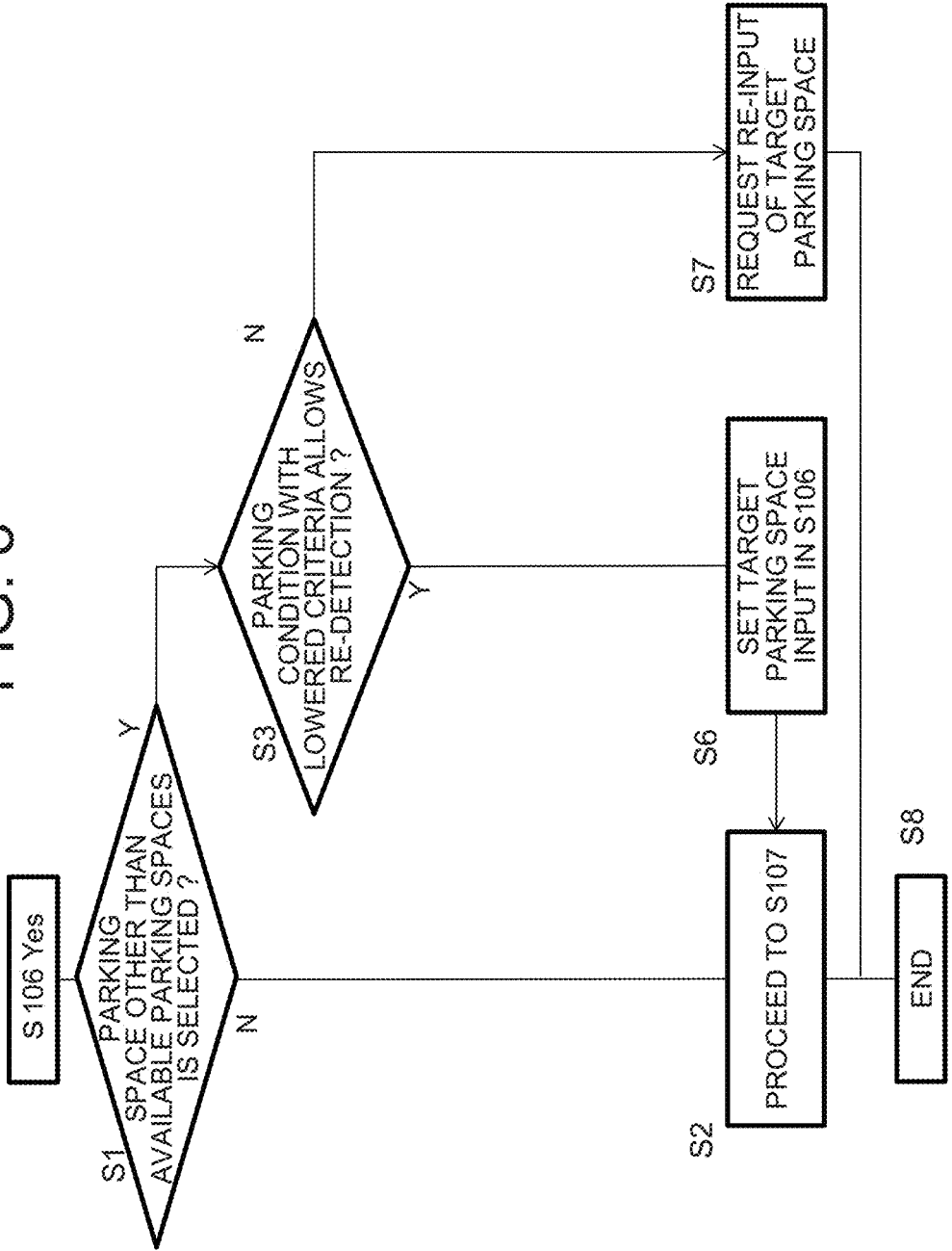

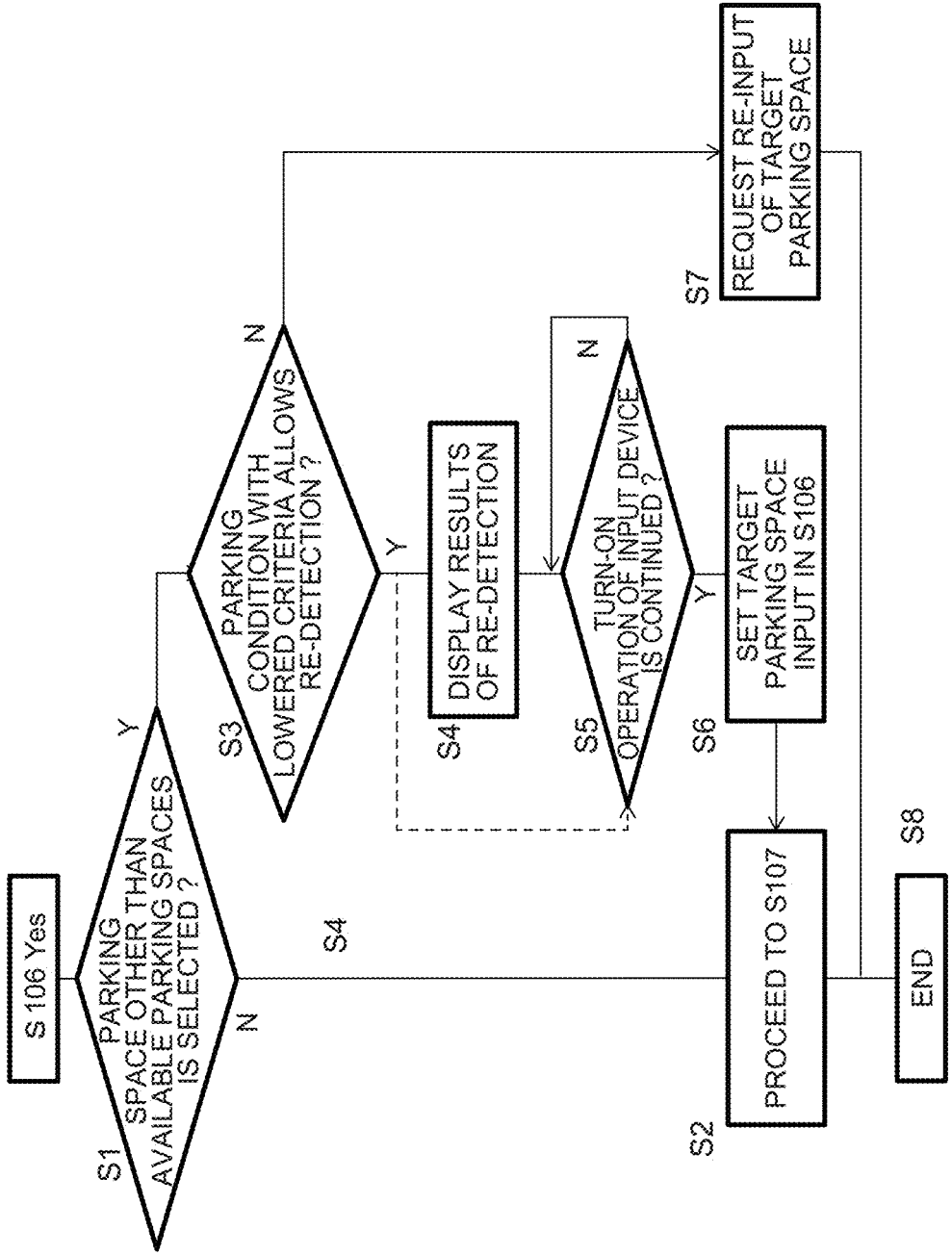

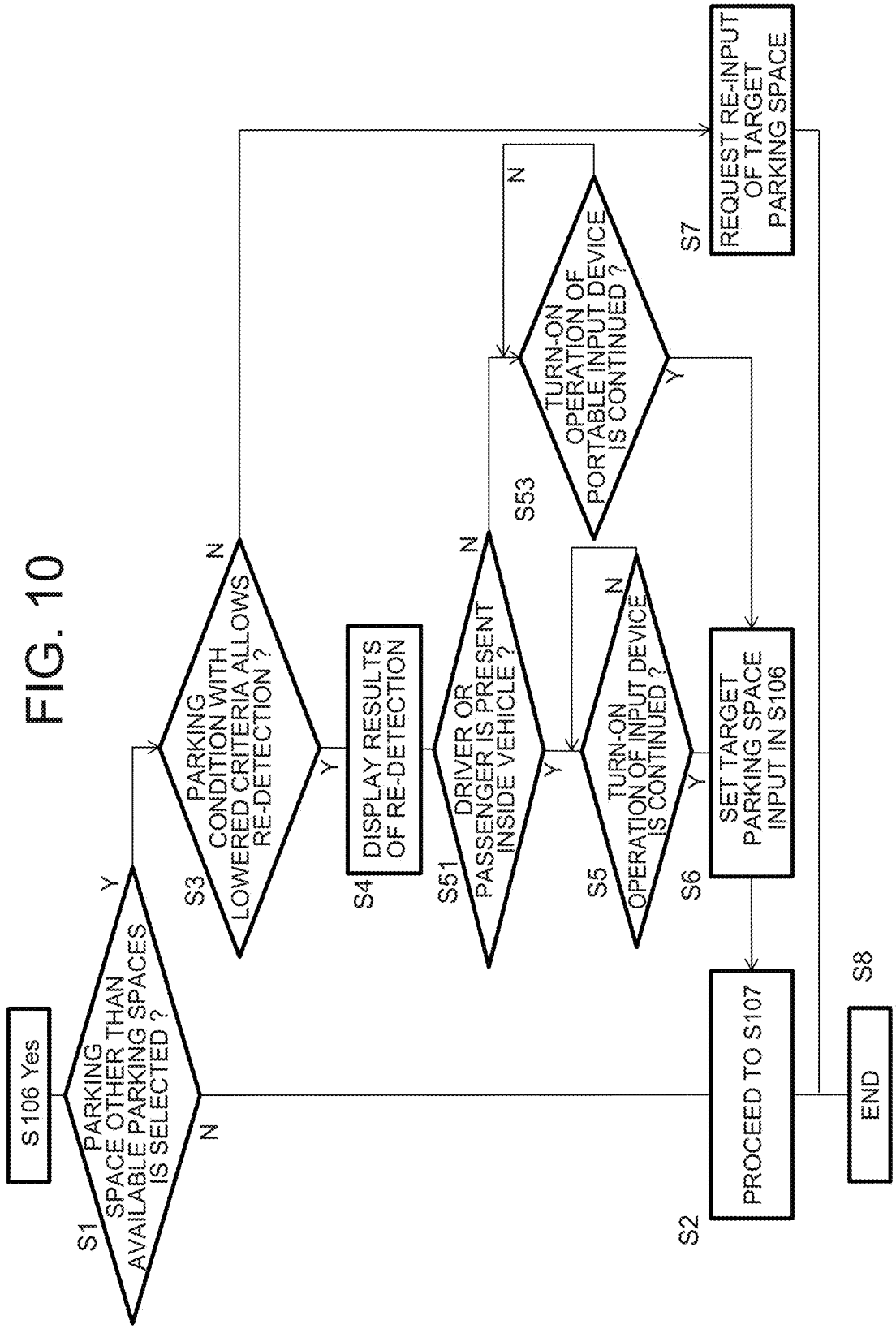

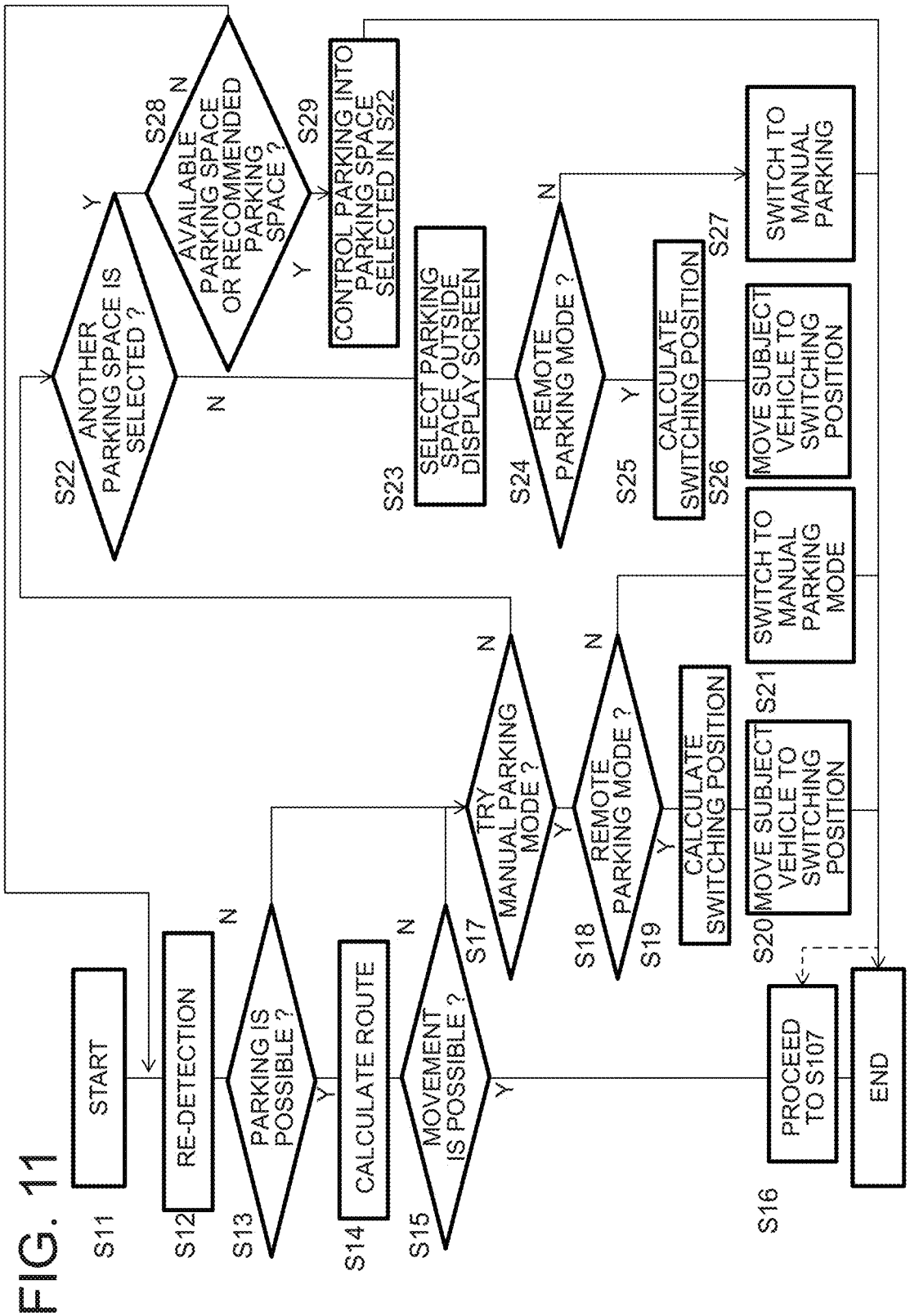

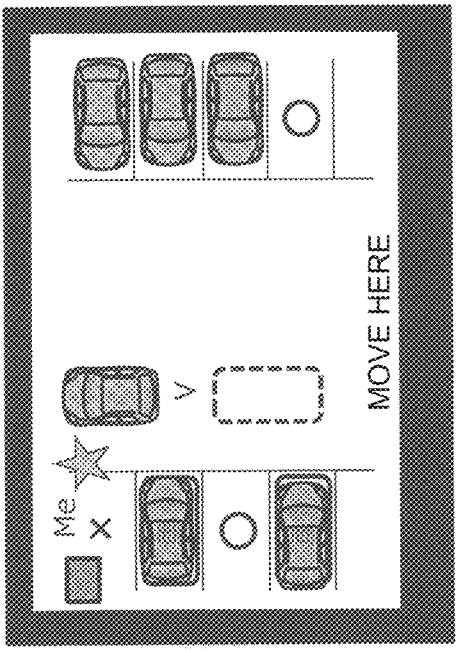
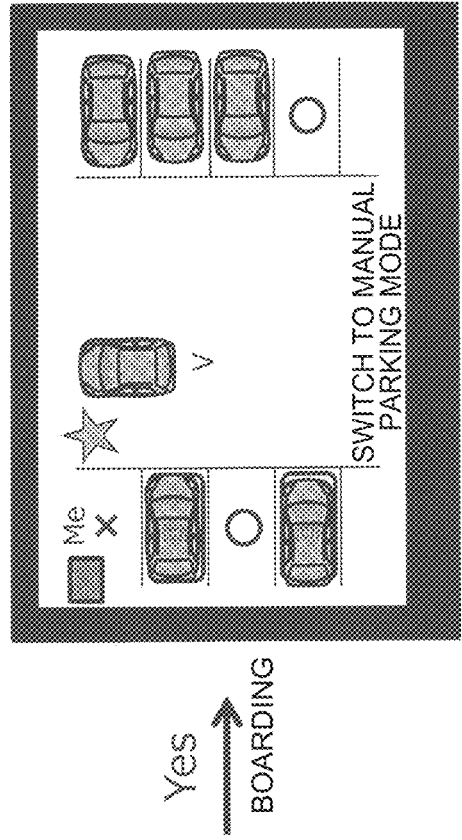
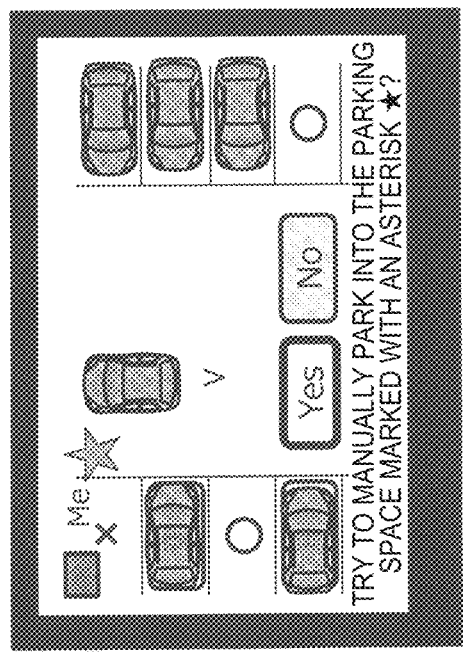

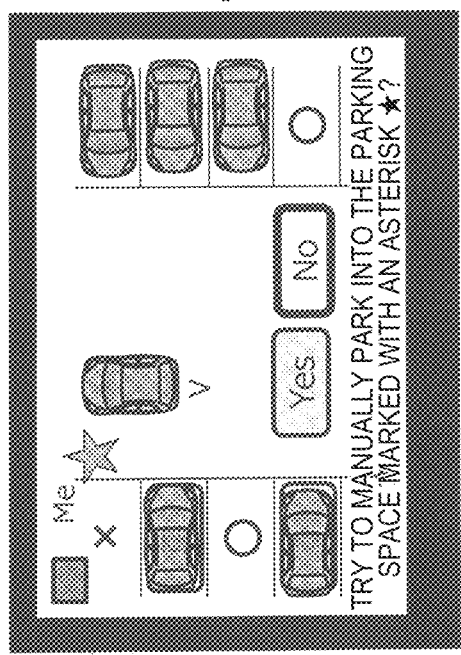
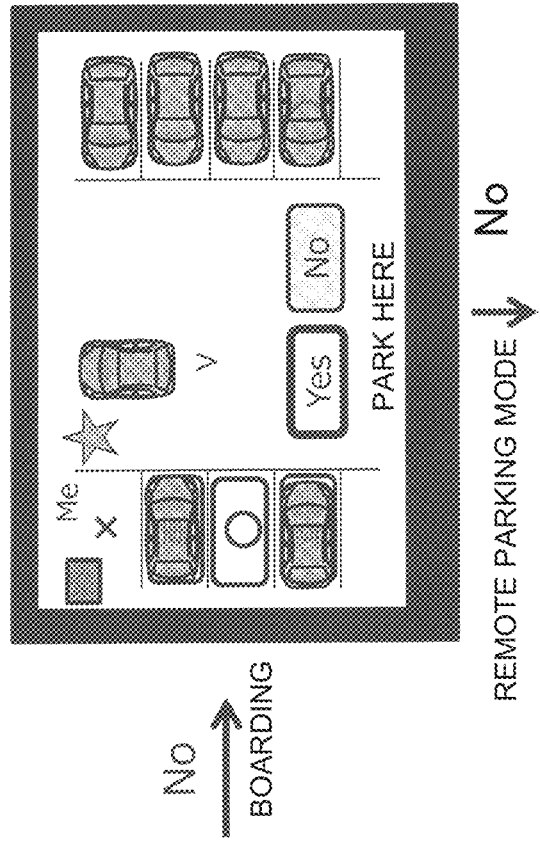
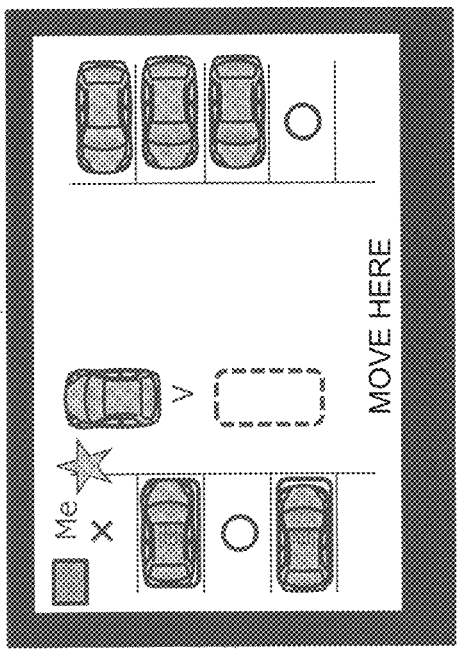

PARKING SUPPORT METHOD AND PARKING SUPPORT DEVICE

TECHNICAL FIELD

The present invention relates to a parking assist method and a parking assist apparatus.

BACKGROUND

With regard to this kind of technique, a technique is known which includes detecting a space into which a subject vehicle can be parked and presenting an available parking space to the user in accordance with a priority level obtained using preregistered unique information of the subject vehicle and the driver (see Japanese Patent Application Publication No. 2009-205191A).

However, Japanese Patent Application Publication No. 2009-205191A is silent about a processing method when the parking space is not detected as an available parking space. It is therefore problematic that, even though parking is actually possible into a parking space, the parking space may not be available.

A problem to be solved by the present invention is to make it possible to use a parking space when the parking space is actually available even in a case in which the parking space is not detected as an available parking space.

SUMMARY

The present invention solves the above problem through detecting a first parking space that satisfies a predefined parking condition and, when information of selecting a second parking space other than the first parking space is input, re-detecting the first parking space.

According to the present invention, when the second parking space other than the first parking space is selected by the driver, a detection process for the first parking space is performed again. This operation makes it possible to use a parking space when the parking space is actually available even in a case in which the parking space is not detected as an available parking space.

BRIEF DESCRIPTION OF THE DRAWINGS

FIG. 3 is a view illustrating an example of positions at which onboard cameras are arranged according to one or more embodiments of the present invention;

FIG. 7 is a view illustrating an example of parking assist information presented in the parking assist process according to one or more embodiments of the present invention;

FIG. 8 is a flowchart illustrating a first example of the control process in a re-detection process for a parking space;

FIG. 9 is a flowchart illustrating a second example of the control process in a re-detection process for a parking space;

FIG. 10 is a flowchart illustrating a third example of the control process in a re-detection process for a parking space;

FIG. 11 is a flowchart illustrating a fourth example of the control process in a re-detection process for a parking space;

FIGS. 12A-12C are a first set of views illustrating examples of the operation screen presented during a re-detection process for a parking space; and FIGS. 13A-13C are a second set of views illustrating examples of the operation screen presented during a re-detection process for a parking space.

DETAILED DESCRIPTION

Hereinafter, one or more embodiments of the present invention will be described with reference to the drawings. In the embodiments, the present invention will be described by exemplifying an example in which a parking assist apparatus according to the present invention is applied to a parking assist system equipped in a vehicle. The parking assist apparatus may be applied to a portable terminal device (equipment such as smartphone and PDA) capable of exchanging information with onboard devices. The method of displaying parking assist information according to the present invention can be used in the parking assist apparatus. Parking assist information relating to the invention of this displaying method is specifically displayed using a display 21.

Parking assist apparatus 100 according to one or more embodiments of the present invention may also be a semi-automated type in which the steering operation is automatically performed while the driver performs the accelerator/brake operation. In addition or alternatively, the parking assist apparatus 100 according to one or more embodiments of the present invention may be a remote-control type in which a vehicle with no driver therein is parked into a predetermined parking space by controlling the movement of the vehicle from the outside operator.

Figure 1:
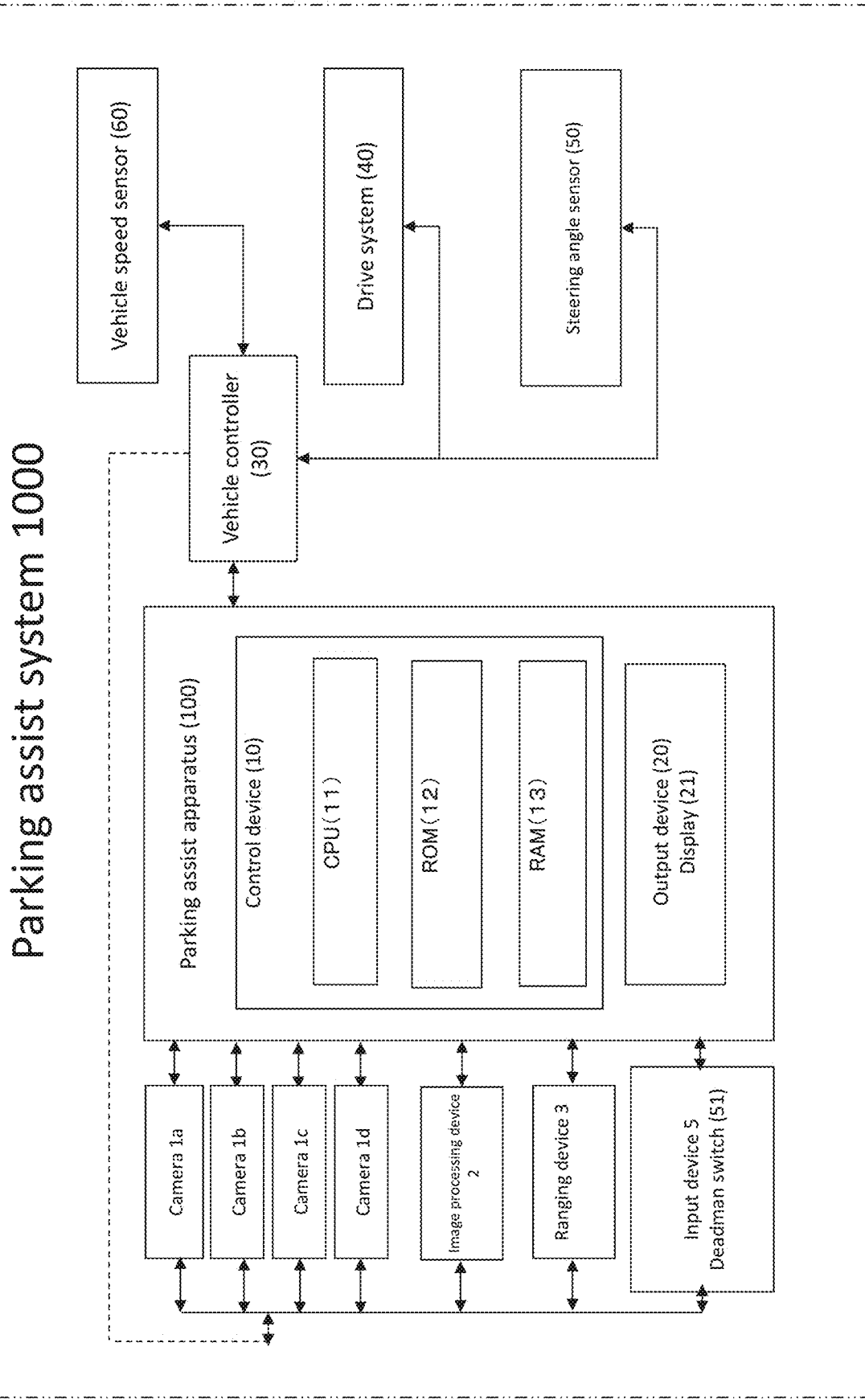
FIG. 1 is a block diagram illustrating an example of a parking assist system according to one or more embodiments of the present invention.

FIG. 1 is a block diagram of a parking assist system 1000 having the parking assist apparatus 100 according to one or more embodiments of the present invention. The parking assist system 1000 according to one or more embodiments of the present invention assists an operation of moving (parking) a subject vehicle into a parking space. The parking assist system 1000 includes cameras 1a to 1d, an image processing device 2, a ranging device 3, an input device 5, the parking assist apparatus 100, a vehicle controller 30, a drive system 40, a steering angle sensor 50, and a vehicle speed sensor 60. The parking assist apparatus 100 includes a control device 10 and an output device 20.

The output device 20 includes a display 21. These components are connected to one another via a controller area network (CAN) or other in-vehicle LAN to mutually exchange information. The output device 20 informs the driver of parking assist information. The display 21 notifies the driver of the parking assist information in accordance with the content of text, the content of a display image, and/or the form of a display image. The display 21 according to one or more embodiments of the present invention is a touch panel type display having an input function and an output function.

The control device 10 of the parking assist apparatus 100 according to one or more embodiments of the present invention is a specific computer comprising a ROM 12 that stores a parking assist program, a CPU as an operation circuit that executes the program stored in the ROM 12 to serve as the parking assist apparatus 100 according to one or more embodiments of the present invention, and a RAM 13 that serves as an accessible storage device.

The parking assist program according to one or more embodiments of the present invention is a program for execution of a control procedure of presenting the parking assist information, which includes information on available parking spaces, on the display 21 and assisting an operation to park the subject vehicle V into a parking space set by the driver. In the parking assist program according to one or more embodiments of the present invention, the parking space for parking may be automatically set.

The parking assist apparatus 100 according to one or more embodiments of the present invention can be applied to an automated parking system with which a vehicle is automatically parked through operations of the steering, accelerator, and brake and can also be applied to a semiautomated parking system with which a part of operations of the steering, accelerator, and brake is manually performed and other operations are automatically performed. In another embodiment of the present invention, the parking assist apparatus 100 can be applied to a system that assists parking through presenting a route to the parking space and guiding the subject vehicle to the parking space.

The control device 10 of the parking assist apparatus 100 according to one or more embodiments of the present invention has functions of executing an information acquisition process, an available parking space detection process, a recommended parking space detection process, a display control process, and a parking control process. Each of the above processes is executed by cooperation of software for implementing the process and the above-described hardware.

Figure 2:
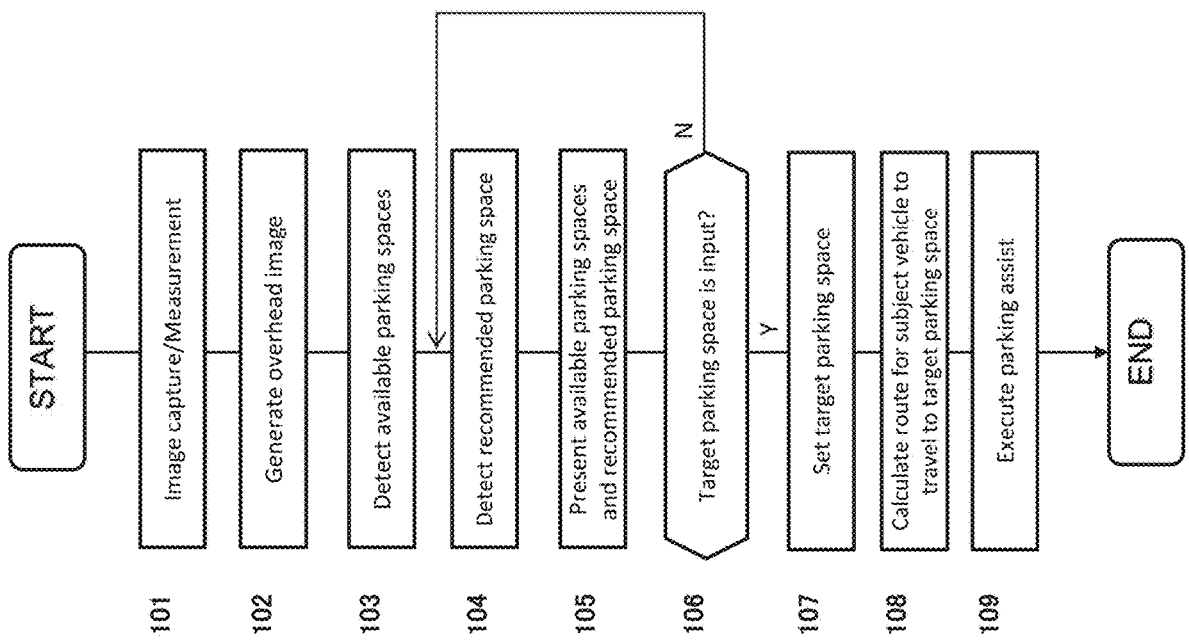
FIG. 2 is a flowchart illustrating an example of a control procedure in the parking assist system according to one or more embodiments of the present invention.

FIG. 2 is a flowchart illustrating a control procedure of the parking assist process executed by the parking assist system 1000 according to one or more embodiments of the present invention. The trigger for starting the parking assist process is not particularly limited, and the parking assist process may be triggered by the operation of a start switch of the parking assist apparatus 100.

The parking assist apparatus 100 according to one or more embodiments of the present invention has a function for automatically moving the subject vehicle V to the parking space. In this process according to one or more embodiments of the present invention, the input device 5 is used. The input device 5 includes a switch, such as a deadman switch, which is turned on only while being pressed. The parking assist apparatus 100 is configured such that the automated driving of the subject vehicle V is executed when a Deadman switch 51 is pressed and the automated driving of the subject vehicle V is suspended when the pressing of the deadman switch 51 is released. The input device 5 according to one or more embodiments of the present invention can be disposed as an onboard device in the vehicle compartment. In addition or alternatively, the input device 5 may be configured as a portable device that can be carried outside the vehicle compartment so that the subject vehicle V can be controlled by the outside operator. The input device includes a communication device and can exchange information with the parking assist apparatus 100. The input device communicates with the parking assist apparatus 100 using a signal including a unique identification code. The parking assist apparatus 100 can find the position of the input device 5, that is, the position of the driver who carries the input device 5, on the basis of the radio field intensity of the input device 5 and positional information to which identification information is appended.

In step 101, the control device 10 of the parking assist apparatus 100 according to one or more embodiments of the present invention acquires images captured by the cameras 1a to 1d attached to multiple sites of the subject vehicle V. The cameras 1a to 1d capture images of boundary lines of parking spaces around the subject vehicle V and objects existing around the parking spaces. The cameras 1a to 1d may be CCD cameras, infrared cameras, or other appropriate imaging devices. The ranging device 3 may be provided at the same position as any of the cameras 1a to 1d or may also be provided at a different position. The ranging device 3 may be a radar device, such as a millimeter-wave radar, laser radar and ultrasonic radar, or a sonar. The ranging device 3 detects the presence or absence of objects, positions of the objects, and distances to the objects on the basis of the received signal of the radar device. Such objects include obstacles, pedestrian, and other vehicles around the vehicle. The received signal is used to determine whether or not the parking space is empty (whether or not a vehicle is parked in the parking space). Obstacles may be detected using the motion stereo technique by the cameras 1a to 1d.

FIG. 3 is a view illustrating an exemplary arrangement of the cameras 1a to 1d disposed on the subject vehicle V. In the example illustrated in FIG. 3, the camera 1a is disposed on the front grille part of the subject vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle.

In step 101, the control device 10 also acquires ranging signals from the ranging device 3, which may be a plurality of modules attached to multiple sites of the subject vehicle V.

In step 102, the control device 10 of the parking assist apparatus 100 controls the image processing device 2 to generate an overhead image. On the basis of the acquired plurality of captured images, the image processing device 2 generates an overhead image in which the surrounding state including the subject vehicle V and the parking space for the subject vehicle V to park is viewed from a virtual viewpoint P (see FIG. 3) above the subject vehicle V. The image processing performed by the image processing device 2 may be conducted, for example, using a method as disclosed in "Development of Around View System, Proceedings of Society of JSAE Annual Congress, 116-07 (October 2007), pp. 17-22, SUZUKI Masayasu, CHINOMI Satoshi, TAKANO Teruhisa." One example of a generated overhead image 21a is illustrated in FIG. 7, which will be described later. This figure illustrates a display example that simultaneously displays the overhead image (top view) 21a around the subject vehicle V and a monitoring image (normal view) 21b around the subject vehicle V.

Referring again to FIG. 2, in steps 103 and 104, the control device 10 detects parking spaces on the basis of a "parking condition" that is preliminarily defined. In one or more embodiments of the present invention, an exemplary case will be described in which the process of specifying available parking spaces and a recommended parking space is a process of detecting the available parking spaces and the recommended parking space. In one or more embodiments of the present invention, the parking assist apparatus 100 (control device 10) detects parking spaces that satisfy the "parking condition," thereby to specify the "available parking spaces" and the "recommended parking space(s)." Processes of specifying the "available parking spaces" and the "recommended parking space(s)" are not limited to those with a detection process, and the "available parking spaces" and "recommended parking space(s)" to be processed may be specified using identification information of the "available parking spaces" and "recommended parking space(s)" which are detected by an external device.

First, the "parking condition" will be described. The parking condition according to one or more embodiments of the present invention includes the following items:

1. Detection condition for parking frame lines;
2. Detection condition for parking spaces;
3. Parking possible condition; and
4. Parking recommendation condition.

The "detection condition for parking frame lines" is a condition for detecting a diagram that represents parking spaces from captured images of a road surface. The "detection condition for parking spaces" is a condition for detecting parking spaces from the diagram of a road surface. The "parking possible condition" is a condition for detecting available parking spaces into which parking is possible. The "parking recommendation condition" is a condition for narrowing down the available parking spaces to a recommended parking space into which parking is recommended for the subject vehicle V. These conditions may each be employed alone as the "parking condition," or a combination of two or more of these conditions may also be employed as the "parking condition."

In step 103, the control device 10 detects parking frame lines to detect parking spaces on the basis of the images captured by the cameras 1$a$ to 1$d$ and/or the data received by the ranging device 3 and uses these information items to detect available parking spaces Me. In one or more embodiments of the present invention, the available parking spaces are detected from the images captured by the cameras 1$a$ to 1$d$, but the process of detecting the available parking spaces is not particularly limited. In an alternative embodiment, information may be acquired from an external server to detect or specify the available parking spaces.

A method of detecting the available parking spaces Me will be described below. The control device 10 determines whether or not the subject vehicle V is traveling in an area that includes parking spaces (such an area will also be referred to as a "parking area," hereinafter), on the basis of the vehicle speed of the subject vehicle V. For example, when the vehicle speed of the subject vehicle V is a predetermined vehicle speed threshold or less and this state continues for a predetermined time or more, the control device 10 determines that the subject vehicle V is traveling in a parking area. The control device 10 determines whether or not the subject vehicle V is traveling in a parking area, on the basis of an attribute of the positional information of a navigation system (not illustrated) (information that the point is included in a parking lot). When the detected positional information has an attribute that represents a parking area such as an area including parking spaces of a highway, for example, a determination is made that the subject vehicle V is traveling in the parking area. In one or more embodiments of the present invention, a determination may be made as to whether or not the detected area is an area including parking spaces, via communication with the outside of the vehicle, that is, via so-called road-to-vehicle communication or vehicle-to-vehicle communication.

When a determination is made that the subject vehicle V is traveling in a parking area, the control device 10 detects white lines on the basis of the captured images acquired for generation of an overhead image. White lines represent boundary lines that define frames (regions) of parking spaces. The control device 10 performs edge detection on the captured images to calculate a luminance difference (contrast). The control device 10 specifies a pixel line having a luminance difference of a predetermined value or more from the overhead image and calculates the width and length of the line. In one or more embodiments of the present invention, frame lines representing parking spaces may not necessarily be white, and other colors such as red may also be employed.

The control device 10 detects lines that satisfy the following condition "1. Detection condition for parking frame lines" as parking frame lines. In one or more embodiments of the present invention, a diagram that satisfies all of (1) to (6) is detected as representing parking frame lines. In an alternative embodiment, any one or more of (1) to (6) may be selected and applied.

1. Detection Condition for Parking Frame Lines (1) The luminance difference of edges is a predetermined threshold or more.

(2) The angle of a line is a predetermined threshold or less.

(3) The width of a line is a predetermined threshold or less.

(4) The length of a continuous edge (line) is a predetermined value or more.

(5) The luminance difference of noise between lines is less than a predetermined threshold.

(6) The likelihood representing the probability as parking frame lines calculated based on the assessment/evaluation values of the above (1) to (5) is a predetermined value or more.

The control device 10 detects parking spaces from candidates of the detected parking frame lines using a known image processing technique such as pattern matching. Specifically, the control device 10 detects parking frame lines that satisfy the following condition "2. Detection condition for parking spaces," as parking spaces. In one or more embodiments of the present invention, parking frame lines that satisfy all of (1) to (3) are detected as parking spaces. The control device 10 has been described as detecting parking spaces from candidates of the detected parking frame lines using a known image processing technique such as pattern matching, but one or more embodiments of the present invention are not limited to this, and parking spaces may be directly detected without detecting parking frame lines. For example, empty spaces having a predetermined range (size) may be detected as parking spaces, or locations at which parking maneuvers were executed in past times may be detected as parking spaces. If a condition that is preliminarily set to define the probability of being parking spaces is satisfied, the parking spaces can be directly detected without detecting parking frame lines.

2. Detection Condition for Parking Spaces (1) Lines extracted as candidates of parking frame lines do not include a line having a length equal to or larger than a first threshold that is preliminarily set (e.g. a length corresponding to an actual distance of 15 [m]).

(2) Lines extracted as candidates of parking frame lines do not include a line having a length equal to or smaller than a second threshold that is preliminarily set (e.g. a length corresponding to an actual distance of 3 to 5 [m]), and a pair of approximately parallel lines does not include a line having a length equal to or larger than a third threshold that is preliminarily set (e.g. a length corresponding to an actual distance of 7 [m]).

(3) Lines extracted as candidates of parking frame lines do not include a line having a length equal to or smaller than a fourth threshold that is preliminarily set (e.g. a length corresponding to an actual distance of 2.5 to 5 [m]), and a pair of approximately parallel lines does not include a line having a length equal to or larger than a fourth threshold that is preliminarily set (e.g. a length corresponding to an actual distance of 15 [m]).

Positional information of parking spaces may be stored so as to be included in map information of a navigation system or may also be acquired from an external server or a management device of facilities (parking lots).

Figure 4A:
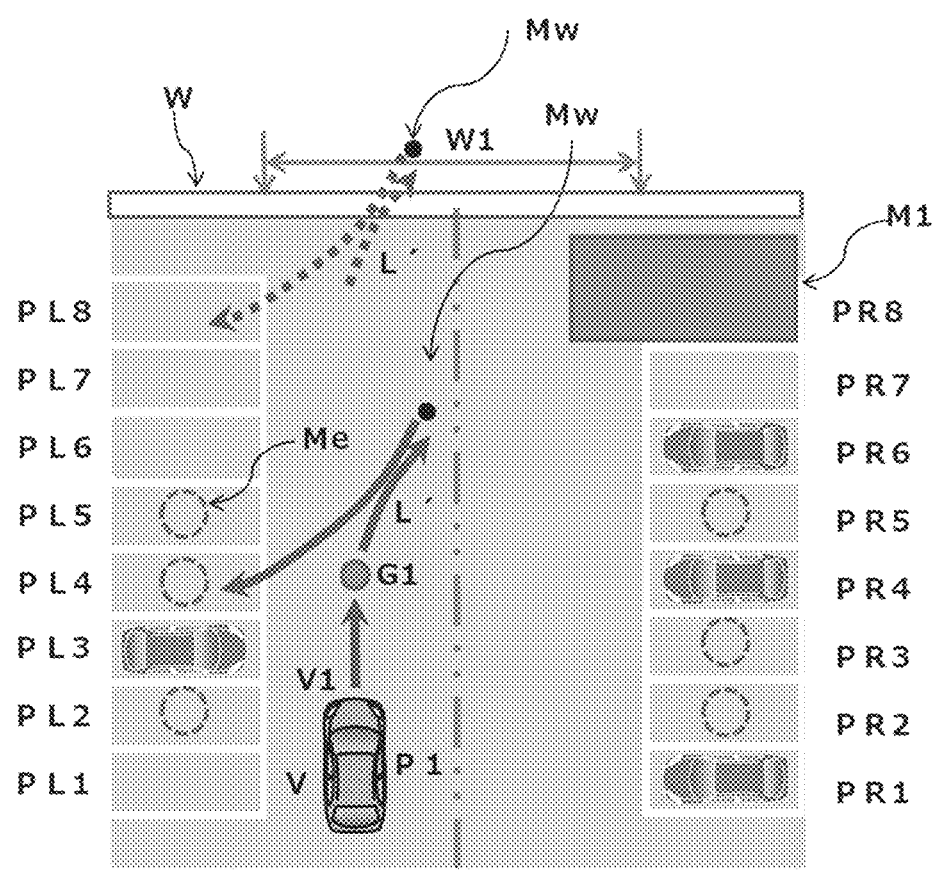
FIG. 4A is a first view for describing an example of a parking assist process according to one or more embodiments of the present invention.

FIG. 4A is a first diagram illustrating an example of the parking assist process according to one or more embodiments of the present invention. In FIG. 4A, the position of the subject vehicle V traveling is P1 and the vehicle speed is V1. The control device 10 detects parking spaces into which the subject vehicle V moving in the direction of the arrow (indicated ahead of the subject vehicle V) can be parked. The position of the subject vehicle V may be represented by the position of the center of gravity V0 of the subject vehicle V, the position of the front bumper of the subject vehicle V, or the position of the rear bumper of the subject vehicle V.

After detecting the parking spaces, the control device 10 detects empty parking spaces using the detection data from the ranging device 3/image processing device 2 in accordance with the following parking possible condition.

The control device 10 stores the "parking possible condition" for extracting the available parking spaces Me. The "parking possible condition" is defined from the viewpoint of extracting parking spaces into which parking is possible. The "parking possible condition" is preferably defined from the viewpoint of the distance from the subject vehicle V, the viewpoint as to whether or not other vehicles are parked, and the viewpoint of presence or absence of obstacles. On the basis of the "parking possible condition," the control device 10 detects the available parking spaces Me into which the subject vehicle V can be parked. The available parking spaces Me are parking spaces into which the subject vehicle V can be parked.

3. Parking Possible Condition

The "parking possible condition" according to one or more embodiments of the present invention is defined from the viewpoint of extracting parking spaces into which the subject vehicle V can be parked.

(1) The distance is within a predetermined distance from the subject vehicle V.

(2) The parking space is empty.

(3) No obstacles are present.

The control device 10 determines whether or not obstacles are present in the parking spaces. In the parking area illustrated in FIG. 4A, the control device 10 does not detect parking spaces PR1, PR4, PR6, and PL3 as the available parking spaces Me because other vehicles are parked therein. Similarly, the control device 10 does not detect a parking space PR8 as the available parking space Me because an obstacle M1 is present therein.

The control device 10 detects a parking space to which the subject vehicle V can move. When a route for the subject vehicle V to move to a parking space can be derived, the control device 10 determines that the subject vehicle V can be parked into the parking space. FIG. 4A illustrates a route L when the subject vehicle V is parked by automated driving. The route L is a route on which the subject vehicle V moves from the current position to an intermediate position Mw located ahead of the subject vehicle V and reverses to complete the parking maneuver into a parking space PL. Such parking maneuver includes one or more turns for parking. Parking spaces to which the routes on the road surface cannot be obtained due to existence of obstacles such as a wall are not detected as the parking spaces into which parking is possible. For example, the route (represented by arrows L of broken lines) to a parking space PL8 cannot be obtained because the wall W is an obstacle. The control device 10 therefore does not detect the parking space PL8 as the available parking space Me.

Although not particularly limited, in the position P1 of the subject vehicle V, the control device 10 detects parking spaces that are located ahead of a reference position of the subject vehicle V and belong to a range of a predetermined distance from the subject vehicle V, as available parking spaces. The reference position of the subject vehicle V can be freely set. Although not particularly limited, in FIG. 4A, parking spaces PL2 to PL5 and PR2 to PR5 belong to the range of detection of the available parking spaces Me. The control device 10 can be configured so as not to detect a parking space PL1 as the available parking space Me because the parking space PL1 will be located behind the subject vehicle V within a certain time. The range of detection can be expanded in accordance with the performance of the cameras 1a to 1d and ranging device 3. Although not particularly limited, the parking assist apparatus 100 according to one or more embodiments of the present invention presents the parking information regarding this range of detection to the driver. As will be understood, the detection range is not limited to the range of parking spaces PL2 to PL5 and PR2 to PR5 and may also be, for example, the range of parking spaces PL1 to PL8 and PR1 to PR8. The range of detection may be limited to a range that includes the parking spaces PR1 to PR8 on the right side of the subject vehicle V and may also be limited to a range that includes the parking space PL1 to PL8 on the left side of the subject vehicle V.

Although not particularly limited, the control device 10 according to one or more embodiments of the present invention detects those, among parking spaces, which are empty (no other vehicles are parked) and belong to a predetermined range of detection and for which routes L can be derived, as the available parking spaces Me. The situation that routes L can be derived refers to a condition that the trajectories of routes L can be rendered on a coordinate system of the road surface without interfering with obstacles (including parked vehicles).

In the example illustrated in FIG. 4A, the control device 10 detects the parking spaces PL2, PL4, PL5, PR2, PR3, and PR5 as the available parking spaces Me within the range of detection. The detected available parking spaces Me are each displayed with a broken line circle Me which is a parking available mark.

Subsequently, the routine proceeds to step 104 in which the control device 10 detects a recommended parking space Mr in accordance with the following parking recommendation condition.

4. Parking Recommendation Condition

The "parking recommendation condition" according to one or more embodiments of the present invention is defined from the viewpoint of extracting a parking space with which the cost required for parking (also referred to as a "parking-related cost," here and hereinafter) is low.

(1) The number of turns for parking is a predetermined number or less.

(2) The time required for parking is a predetermined time or less.

(3) The travel distance required for parking is a predetermined distance or less.

The control device 10 detects the recommended parking space Mr in accordance with the traveling state of the subject vehicle V from among the detected plurality of available parking spaces. The control device 10 stores the "parking recommendation condition" for extracting the recommended parking space Mr. The "parking recommendation condition" is defined from the viewpoint of extracting a parking space with which the parking-related cost is low. The "parking recommendation condition" is preferably defined from the viewpoints of the number of turns for parking, the time required for parking, and the travel distance required for parking. On the basis of the "parking recommendation condition," the control device 10 extracts the recommended parking space Mr, with which the parking-related cost is low, from among the available parking spaces.

A method of detecting the recommended parking space Mr will be described below. The control device 10 calculates the parking-related cost for each available parking space. The parking-related cost includes those relating to the time required for parking, the number of operations required for parking (such as the number of steering operations and the number of brake/accelerator operations), and the travel distance required for parking. The control device 10 obtains a route for parking into each available parking space Me and calculates the time required for parking, the number of operations, and the travel distance on the route. The control device 10 calculates the parking-related cost on the basis of the calculation results of each route.

The control device 10 calculates the route when parking the subject vehicle V into each available parking space Me. The route is a trajectory from the position at which the parking assist process is started (start position) to the position at which the subject vehicle V arrives at a parking completion position in each available parking space Me. The control device 10 sets the start position for each available parking space Me. The control device 10 calculates a route from the start position to each available parking space Me. The number of routes for automated driving is not limited to one, and the control device 10 may calculate a plurality of routes in accordance with the surrounding situations.

The parking-related cost is different, such as those relating to the number of turns for parking on a route, the length of the route, the time for moving along the route (time for parking), and the maximum steering angle, which are calculated for each available parking space Me. The smaller the number of turns for parking, the shorter the time required for parking (the parking-related cost is small). The shorter the length of the route, the shorter the time required for parking (the parking-related cost is small). The smaller the maximum steering angle, the shorter the time required for parking (the parking-related cost is small). On the other hand, the larger the number of turns for parking, the longer the time required for parking (the parking-related cost is large). The longer the length of the route, the longer the time required for parking (the parking-related cost is large). The larger the maximum steering angle, the longer the time required for parking (the parking-related cost is large).

Description will be made, for example, for an exemplary case in which the subject vehicle V is parked into an available parking space PL6 or PL7 illustrated in FIG. 4A. The distance from the parking space PL7 to the wall W is shorter than the distance from the parking space PL6 to the wall W. The number of turns for parking when parking into the parking space PL7 is larger than the number of turns for parking when parking into the parking space PL6 (the parking-related cost is higher in the former case). The time required for parking into the parking space PL7 is longer than the time required for parking into the parking space PL6 (the parking-related cost is higher in the former case).

The control device 10 calculates the parking-related cost (including the time for parking) for parking into each available parking space and stores the parking-related cost so that it is associated with the identifier of each available parking space. The control device 10 calculates the parking-related cost for parking into each available parking space Me using any one or more of the parking-related cost in accordance with the number of turns for parking on the route, the parking-related cost in accordance with the length of the route, the parking-related cost in accordance with the time for moving along the route (time for parking), and the parking-related cost in accordance with the maximum steering angle. Each parking-related cost may be calculated such that weighting is defined in accordance with the type.

Then, a recommended parking space in accordance with a gaze point distance is detected.

The control device 10 calculates the gaze point distance on the basis of the vehicle speed of the subject vehicle V. The gaze point distance refers to a distance from the position of the subject vehicle V to the position (gaze point) which the driver of the subject vehicle V gazes on. The control device 10 detects the parking space corresponding to the position which the driver gazes on, as the recommended parking space.

In general, the higher the vehicle speed, the farther the driver gazes on, and the lower the vehicle speed, the closer the driver gazes on. From the viewpoint of recommending a parking space in accordance with the observing point of the driver, the control device 10 sets a longer gaze point distance as the vehicle speed of the subject vehicle V is higher, and sets a shorter gaze point distance as the vehicle speed of the subject vehicle V is lower. This allows the parking assist into the parking space to be executed in accordance with the intention of the driver. The gaze point distance is not necessarily linear and may also be defined along a curve. The direction of the gaze point distance can be set in accordance with the steering angle of the subject vehicle V.

Figure 5:
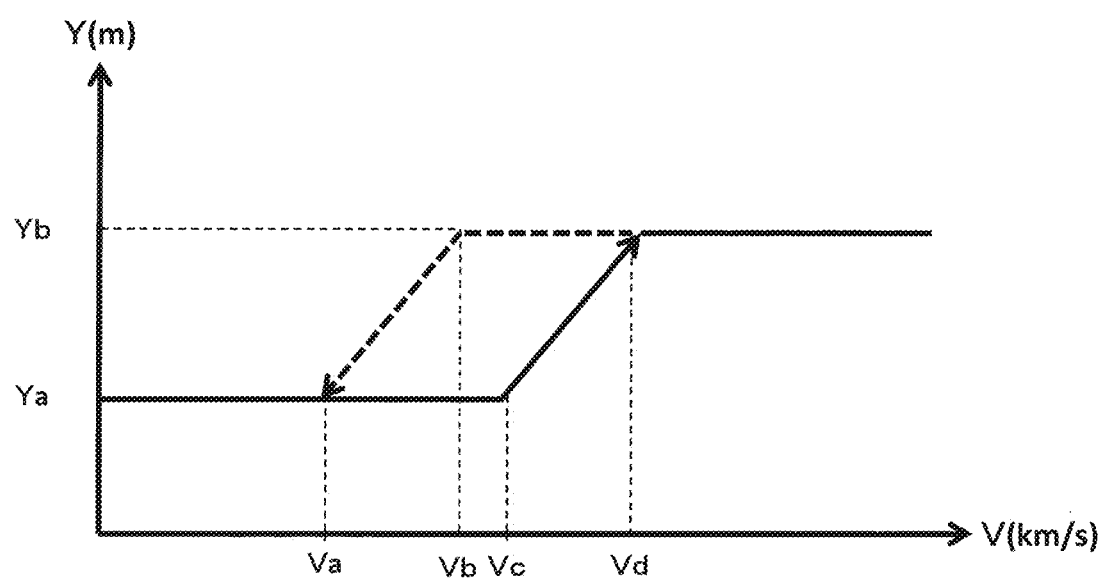
FIG. 5 is a graph illustrating the relationship between a vehicle speed (V [km]) and a gaze point distance (Y [m])

FIG. 5 is a graph illustrating the relationship between the vehicle speed (V [km/s]) and the gaze point distance (Y [m]). The solid line represents the above relationship when the vehicle speed increases while the broken line represents the above relationship when the vehicle speed decreases. As illustrated in FIG. 5, when the vehicle speed is Va or lower, the gaze point distance is Ya. Also when the vehicle speed is Va or higher and Vc or lower, the gaze point distance is Ya. When the vehicle speed is Vc or higher and Vd or lower, the gaze point distance Y increases in proportion to the vehicle speed V. When the vehicle speed is Vd or higher, the gaze point distance is Yb. On the other hand, when the vehicle speed lowers below Vd, the gaze point distance decreases along the broken line of FIG. 5. While the vehicle speed lowers from Vd to Vb, the gaze point distance is Yb. While the vehicle speed lowers from Vb to Va, the gaze point distance Y decreases in proportion to the vehicle speed V. Thus, the relationship between the vehicle speed V and the gaze point distance Y has a hysteresis characteristic between the increasing direction and decreasing direction of the vehicle speed V.

The ROM 12 of the control device 10 stores a map (e.g. the relationship illustrated in FIG. 5) between the vehicle speed V and the gaze point distance Y. The control device 10 acquires the information on the vehicle speed V from the vehicle speed sensor 60 and refers to the map to calculate the gaze point distance Y in accordance with the vehicle speed V. The control device 10 detects a parking space in the vicinity of the gaze point which is separate from the subject vehicle V by the gaze point distance Y (i.e., the parking space is located within a predetermined distance from the gaze point).

If the vehicle speed decreases when the recommended parking space is presented, the gaze point distance of the driver decreases and the gaze point comes close to the subject vehicle V (moves toward the near side of the subject vehicle V). If, in response to this approach of the gaze point, the recommended parking space is changed from a distant one (e.g. the parking space PL5) to a nearby one (e.g. the parking space PL4), the position of the recommended parking space Mr will move in the direction of approaching the subject vehicle V (in the rearward direction) even though the subject vehicle V moves frontward on the screen. Such movement of the recommended parking space Mr is unnatural and may confuse the driver. As illustrated in FIG. 5, the parking assist apparatus 100 according to one or more embodiments of the present invention is designed such that the gaze point distance when the vehicle speed decreases has a hysteresis characteristic. Such a hysteresis characteristic allows the gaze point distance Yd to be maintained even when the vehicle speed decreases. This can prevent unnatural display such that the position of the recommended parking space Mr moves backward in the traveling direction of the subject vehicle V and approaches the subject vehicle V. In the parking assist apparatus 100 according to one or more embodiments of the present invention, the previously-described parking recommendation condition may include the gaze point distance. This enables recommendation of the parking space in accordance with the observing point of the driver.

Figure 4B:
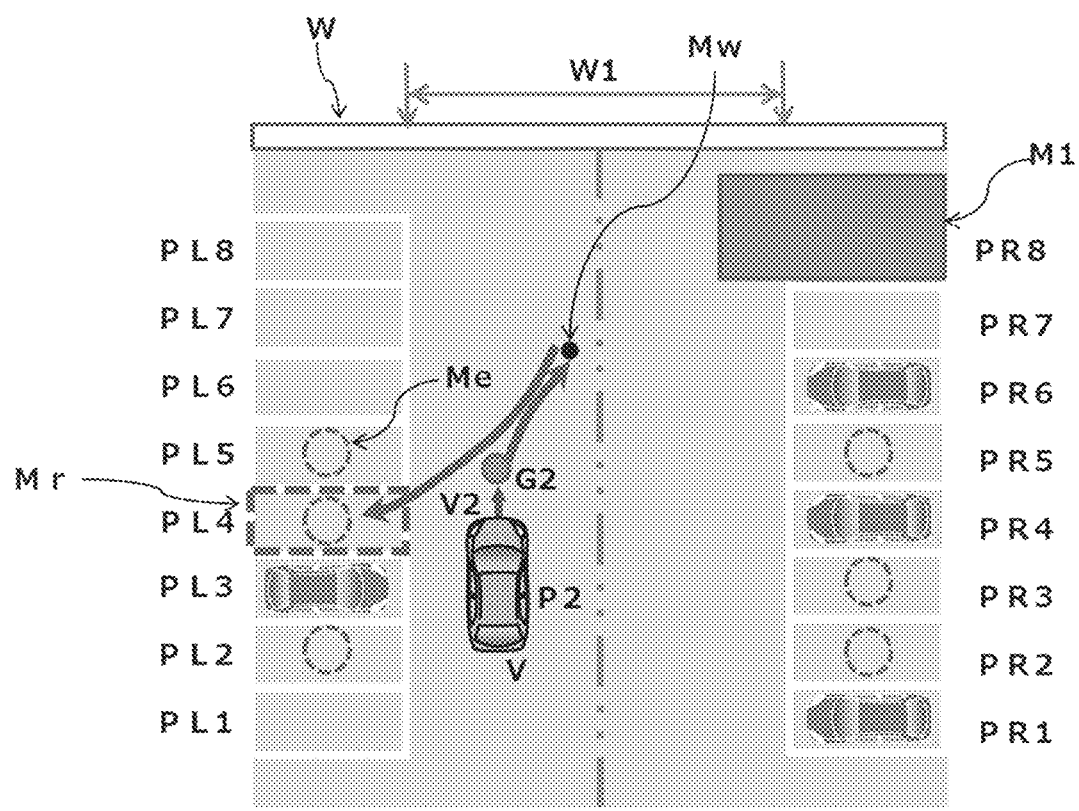
FIG. 4B is a second view for describing an example of the parking assist process according to one or more embodiments of the present invention.

FIG. 4B illustrates a state in which the subject vehicle V moves forward from the position P1 illustrated in FIG. 4A to a position P2. The speed of the subject vehicle V at the position P2 is V2 (<V1). The control device 10 refers to the map to calculate the gaze point distance corresponding to the vehicle speed V2. The control device 10 specifies a point G2 that is separate from the position P2 by the gaze point distance, as a gaze point (G2). The subject vehicle V is in a state of selecting a parking space with the lowered vehicle speed V2 (<V1). The distance between the gaze point G2 and the subject vehicle V is shorter than the distance between the gaze point G1 illustrated in FIG. 4A and the subject vehicle V because the vehicle speed is lowered.

In the state illustrated in FIG. 4B, the control device 10 detects a recommended parking space from among the parking spaces PL2, PL4, PL5, PR2, PR3, and PR5 in the vicinity of the gaze point G2. Parking is possible into these parking spaces. The control device 10 detects the recommended parking space on the basis of the parking-related cost for each of the parking spaces PL2, PL4, PL5, PR2, PR3, and PR5.

The control device 10 assigns identification numbers to the available parking spaces Me in the vicinity of the gaze point G2. The control device 10 calculates the parking-related cost for parking into each available parking space Me. The control device 10 may read out the parking-related cost for parking which is previously calculated. The parking-related cost for parking into each available parking space Me reflects a load such as a time for parking required for moving the subject vehicle V to the parking space by automated driving, the number of operations, and the moving distance. The parking-related cost for parking is a different index from the difficulty level when the driver completes the parking maneuver. The control device 10 calculates the time required for parking into each available parking space Me. In the example of FIG. 4B, the control device 10 calculates the time required for parking into each of the parking spaces PL2, PL4, PL5, PR2, PR3, and PR5 into which parking is possible, and stores the time required for parking such that it is associated with each identification number.

The control device 10 compares the parking-related cost for parking into each available parking space Me and a predetermined threshold that is preliminarily set. The predetermined threshold is the upper limit threshold of the parking-related cost which includes the time required for parking by automated driving. When the time (parking-related cost) required for parking into an available parking space Me is less than the predetermined threshold, the control device 10 detects the available parking space Me as the recommended parking space Mr. On the other hand, when the time (parking-related cost) required for parking into an available parking space Me is not less than the predetermined threshold, the control device 10 does not detect the available parking space Me as the recommended parking space Mr. An available parking space Me with which the time required for parking is minimum (the parking-related cost is lowest) may be detected as the only recommended parking space Mr.

The control device 10 detects an available parking space Me, among the available parking spaces Me, with which the parking-related cost is lowest, as the recommended parking space Mr. In the example illustrated in FIG. 4B, the parking space PL4 is detected as the recommended parking space Mr because the parking-related cost (the time required for parking) is lower than the predetermined threshold and the gaze point is closest (the parking-related cost is lowest).

Figure 4C:
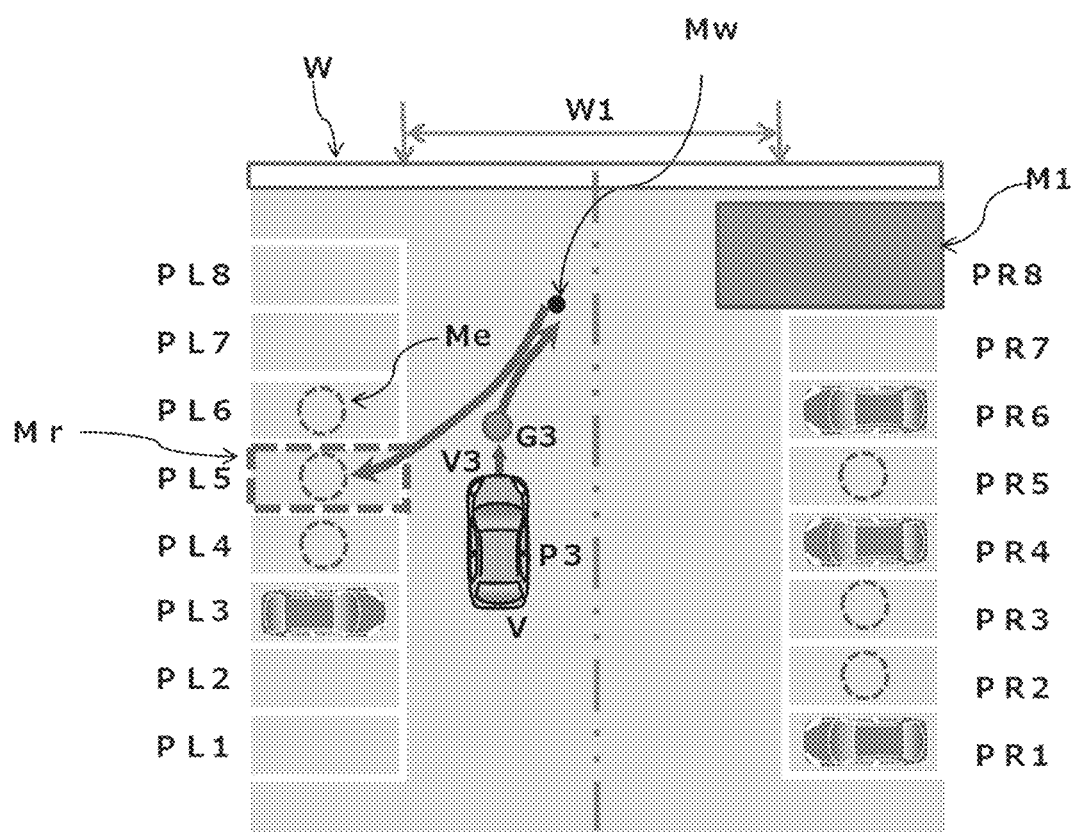
FIG. 4C is a third view for describing an example of the parking assist process according to one or more embodiments of the present invention.

The control device 10 executes the detection process for the recommended parking space Mr at a predetermined period. As illustrated in FIG. 4C, also when the subject vehicle V moves forward to the position P3 at a vehicle speed of V3, the control device 10 detects a new recommended parking space Mr. The control device 10 calculates a new gaze point G3 and the parking-related cost required for moving from the current position to each available parking space Me and detects the parking space PL5, with which the parking-related cost is lowest, as the recommended parking space Mr.

In step 105, the control device 10 displays the available parking spaces Me and the recommended parking space Mr on the display 21. The method of displaying the available parking spaces Me and the recommended parking space Mr according to one or more embodiments of the present invention will be described later in detail.

In step 106, a determination is made as to whether or not a target parking space Mo is input. The target parking space Mo refers to a parking space into which the subject vehicle V is parked by automated driving, that is, a target position in automated driving. The target parking space Mo is input by the driver or a passenger (operator/occupant). For example, when the display 21 is a touch panel-type display, the driver or a passenger touches a portion representing a desired parking space thereby to specify the target parking space Mo, and information on the target parking space Mo is input to the control device 10. When the target parking space Mo is input in step 106, the control flow proceeds to step 107. On the other hand, when the target parking space Mo is not input, the control flow returns to step 104, and the control flow from step 104 to step 106 is executed.

When the target parking space Mo is input, this parking space is set as the target parking space Mo in step S107.

In step 108, the control device 10 calculates a route for moving the subject vehicle V to the target parking space Mo.

Figure 4D:
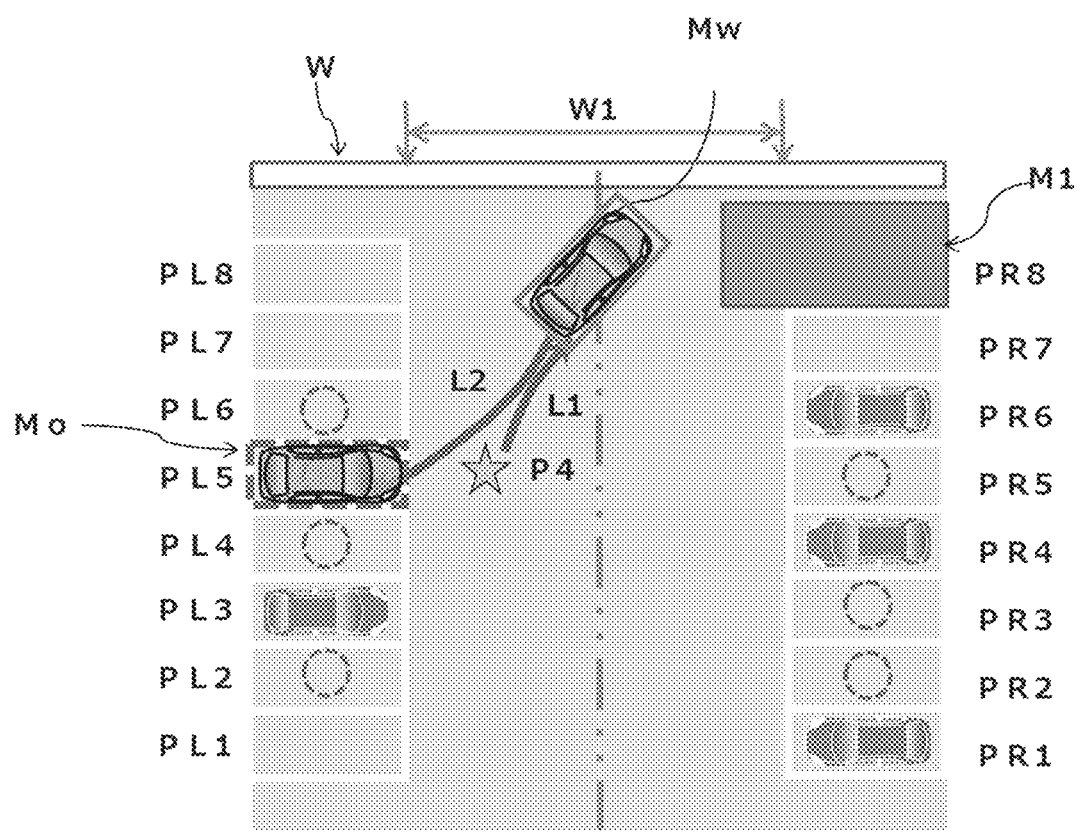
FIG. 4D is a fourth view for describing an example of the parking assist process according to one or more embodiments of the present invention.

FIG. 4D is a view illustrating a scene in which the parking space PL5 is specified as the target parking space Mo. The control device 10 calculates a route for parking on the basis of the positional relationship between the position P4 of the subject vehicle V at which the parking maneuver (movement) is started and the position of the target parking space Mo. Although not particularly limited, the control device 10 calculates the route to include a curve L1 and a curve L2. The curve L1 lies from the stop position of the subject vehicle V, that is, a position at which the parking assist is started, to the intermediate position Mw at which the turn for parking is performed. The curve L2 lies from the intermediate position Mw to the target parking space Mo (PL5).

The control device 10 reads routes corresponding to the selected parking mode and calculates a route on the basis of the positional relationship between the position of the subject vehicle V when starting the automated parking process and the position of the target parking space Mo. When the driver presses the previously-described deadman switch during the operation of the automated parking mode, the control device 10 controls the vehicle controller 30 to execute the process of moving the subject vehicle V to the target parking space Mo on the calculated route.

Figure 6C:
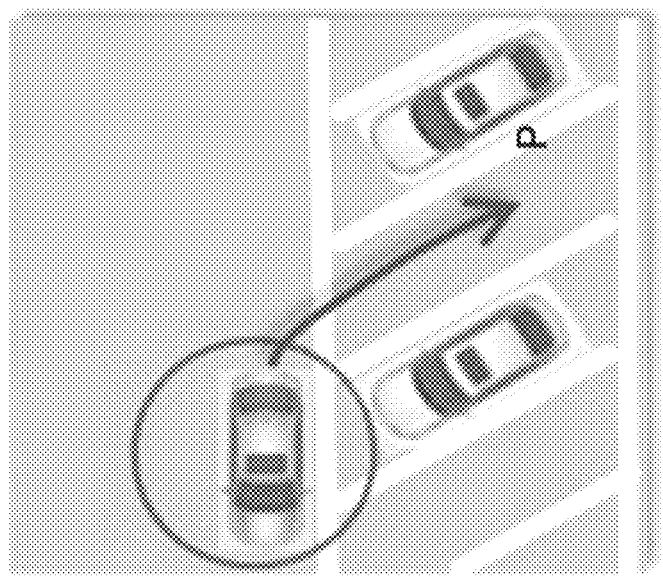
FIGS. 6A-6C are a set of views illustrating examples of parking patterns to which the parking assist process according to one or more embodiments of the present invention is applied.
Figure 6B:
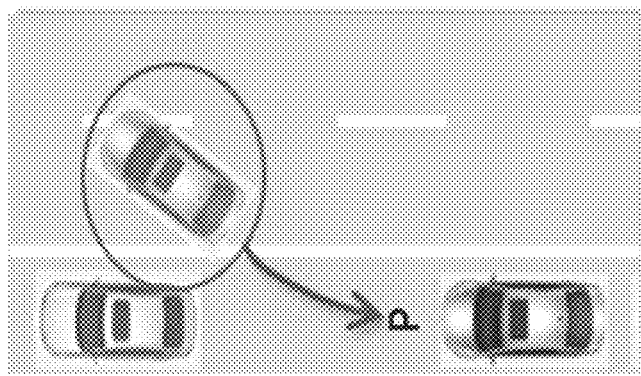
Figure 6A:
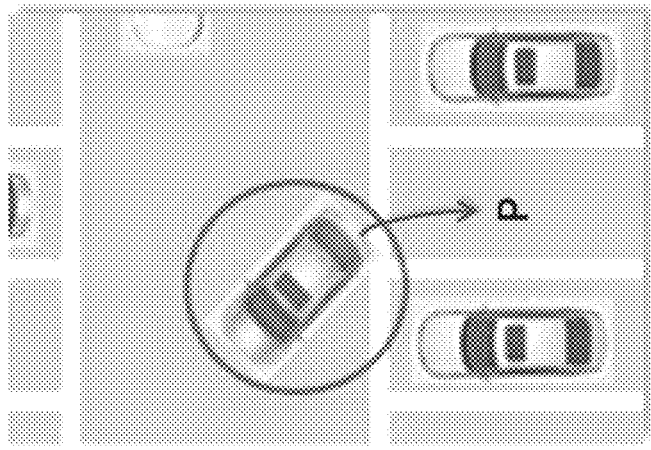

The control device 10 calculates the route corresponding to each of right-angle parking, parallel parking, and oblique parking illustrated in FIGS. 6A-6C, respectively. In one or more embodiments of the present invention, the route has been described as being calculated, but the present invention is not limited to this. In an alternative embodiment, a route corresponding to the type of the parking space is stored in a memory (ROM), and the route may be read out when parking. The route and the parking mode (such as right-angle parking, parallel parking, and oblique parking) may be selected by the driver of the subject vehicle V.

In step 109, the parking assist apparatus 100 according to one or more embodiments of the present invention executes the parking assist process or the automated parking process. The parking assist apparatus 100 according to one or more embodiments of the present invention controls the operation of the drive system 40 via the vehicle controller 30 so that the subject vehicle V moves along the route.

The parking assist apparatus 100 calculates command signals to the drive system 40 of the subject vehicle V, such as an EPS motor, while feeding back the output value of the steering angle sensor 50 of the steering apparatus so that the travel trajectory of the subject vehicle V coincides with the calculated route, and sends the command signals to the drive system 40 or to the vehicle controller 30 which controls the drive system 40.

The parking assist apparatus 100 according to one or more embodiments of the present invention includes a parking assist control unit. The parking assist control unit acquires shift range information from an AT/CVT control unit, wheel speed information from an ABS control unit, steering angle information from a steering angle control unit, engine speed information from an ECM, and other necessary information. On the basis thereof, the parking assist control unit calculates and outputs instruction information on the automated steering to the EPS control unit, instruction information such as warning to a meter control unit, etc. The control device 10 acquires information items, which are acquired by the steering angle sensor 50 of the steering apparatus of the subject vehicle V and the vehicle speed sensor 60 and other sensors of the vehicle, via the vehicle controller 30.

The drive system 40 according to one or more embodiments of the present invention allows the subject vehicle V to move (travel) from the current position to the target parking space Mo by driving based on the control command signals acquired from the parking assist apparatus 100. The steering apparatus according to one or more embodiments of the present invention is a drive mechanism that moves the subject vehicle V in the right and left directions. The EPS motor included in the drive system 40 drives the power steering mechanism of the steering of the steering apparatus on the basis of the control command signals acquired from the parking assist apparatus 100 to control the steering amount and assists the operation when moving the subject vehicle V to the target parking space Mo. The content of the parking assist and the process of operation are not particularly limited, and processes known at the time of filing of this application can be appropriately applied.

When the parking assist apparatus 100 according to one or more embodiments of the present invention controls the subject vehicle V to move to the target parking space Mo along the route calculated based on the position P4 of the subject vehicle V and the position of the target parking space Mo, the accelerator and the brake are automatically controlled on the basis of the specified control vehicle speed (set vehicle speed), and the operation of the steering apparatus is also automatically controlled in accordance with the vehicle speed. That is, during the parking assist according to one or more embodiments of the present invention, the steering operation and the accelerator/brake operation are automatically performed. Furthermore, the parking assist apparatus 100 according to one or more embodiments of the present invention is also applicable to manual parking in which the driver performs operation of the accelerator, brake and steering.

In addition, it is also possible to perform a parking process by remote control that includes transmitting a setting command for the target parking space Mo, a parking process start command, a parking suspension/cancellation command, etc. to the subject vehicle V with no driver therein from the outside operator.

As will be understood, it is also possible for the driver to operate the accelerator/brake, and only the operation of the steering apparatus is automatically controlled. In this case, the parking assist apparatus 100 controls the drive system 40 on the basis of the set vehicle speed which is preliminarily calculated so that the subject vehicle V follows the route to move, and controls the steering apparatus of the subject vehicle V on the basis of the set steering angle which is also preliminarily calculated.

Thus, the parking assist apparatus 100 has an automated travel mode that does not require the operation by the driver and a manual operation mode that requires the operation by the driver. The automated travel mode includes an on-board operation mode in which the driver boards and operates the subject vehicle V and a remote operation mode in which the operator (driver) remotely controls the subject vehicle V from the outside of the subject vehicle V.

A method of presenting parking assist information in the parking assist apparatus 100 according to one or more embodiments of the present invention will be described below. In one or more embodiments of the present invention, the parking assist information is presented using the output device 20 which includes the display 21.

First, a method of displaying parking assist information using the display 21 will be described.

FIG. 7 illustrates an example of the method of displaying parking assist information.

In the display examples illustrated in FIG. 7, an overhead image (top view) 21a is displayed on the left side of the screen of the display 21, a monitoring image (normal view) 21b is displayed on the right side of the screen of the display 21, and messages 21c are displayed above the monitoring image 21b. The overhead image 21a includes an image (boundary lines of parking spaces) that indicates selectable parking spaces. The center of the overhead image 21a is displayed with an icon of the subject vehicle V indicating the position of the subject vehicle V. The monitoring image 21b can be displayed with different images captured by the cameras 1a to 1d in accordance with the operation state of the subject vehicle V. The monitoring image 21b illustrated in FIG. 7 is displayed as an image captured by the camera 1a which is disposed on the front grill part of the subject vehicle V. When the subject vehicle V moves back, the monitoring image 21b may be displayed as an image captured by the camera 1d which is disposed in the vicinity of the rear bumper. In this example, the overhead image 21a and the monitoring image 21b are simultaneously displayed on the display 21, but only the overhead image 21a may be displayed on the display 21, or only the monitoring image 21b may be displayed on the display 21.

FIG. 7 illustrates the parking assist information displayed when the target parking space Mo is being searched. The subject vehicle V moves forward and the control device 10 waits for the selection information of the target parking space Mo to be entered. FIG. 7 illustrates a scene in which the previously-described parking space PL4 illustrated in FIG. 4B is detected as the recommended parking space Mr.

The overhead image 21a is displayed with the available parking spaces Me and the recommended parking space Mr. In a scene in which the subject vehicle V searches for the available parking space Me while moving in the parking lot, the available parking spaces Me and the recommended parking space Mr change as the subject vehicle V moves. The parking assist apparatus 100 displays the available parking spaces Me and the recommended parking space Mr which are sequentially detected. The parking assist apparatus 100 displays the available parking spaces Me with parking available marks in a circular shape and displays the recommended parking space Mr with a recommendation mark in a rectangular shape.

As illustrated in FIG. 7, when the subject vehicle V is moving, the available parking spaces Me and the recommended parking space Mr sequentially change as the subject vehicle V moves. When an available parking space Me or recommended parking space Mr changes, the parking assist apparatus 100 changes and displays the position of the available parking space or recommended parking space. When the vehicle speed of the subject vehicle V is high, if an available parking space Me or recommended parking space Mr is close to the subject vehicle V, the display position of the parking available mark or recommendation mark is changed each time the available parking space Me and the recommended parking space Mr change. If the display position suddenly changes, the time for selecting the available parking space Me or the recommended parking space Mr may be insufficient.

As previously described, the control device 10 according to one or more embodiments of the present invention detects a parking space among the available parking spaces that satisfies the parking condition for extracting a parking space to be recommended for the driver, as the recommended parking space.

The parking assist apparatus 100 according to one or more embodiments of the present invention displays the recommended parking space in a first display form. The recommended parking space is a parking space among the available parking spaces that requires a short time for the parking process of the subject vehicle V. It cannot be said that a parking space that requires a long time for the parking process (requires a high parking-related cost) is convenient for the driver who utilizes the parking assist apparatus 100. Examples of such a parking space include a parking space that is far from the current position and a parking space that requires a number of turns for parking. From such viewpoints, in one or more embodiments of the present invention, a parking space that requires a short time for the parking process of the subject vehicle V is extracted as the recommended parking space.

As the subject vehicle V moves, the recommended parking space which exists ahead of the subject vehicle V may relocate (relatively) to behind the subject vehicle V. In other words, the recommended parking space changes (transitions) to another one as the subject vehicle V moves. This is also true for the available parking spaces. In one or more embodiments of the present invention, the first parking space to be displayed is a parking space that satisfies the above-described parking condition, and examples of the first parking space include the available parking spaces and the recommended parking space (here and hereinafter).

It is assumed that a parking space that exists ahead of the subject vehicle V is detected as the first parking space (examples of the first parking space include the available parking spaces and the recommended parking space, here and hereinafter) and its position is displayed. After that, if the first parking space detected before the movement becomes behind the subject vehicle V as the subject vehicle V moves, the first parking space detected before the movement is no longer a parking space that is suitable as the target parking space Mo. When parking into the first parking space detected before the movement, if the first parking space is located behind, the travel distance will be long and the number of turns for parking will increase. In this case, therefore, the time required for the parking process by the automated driving will be long and increase the parking-related cost.

Similarly, if, after the first parking space is detected, another first parking space (its examples include the available parking spaces and the recommended parking space, here and hereinafter) is detected, the first parking space which is previously detected is no longer a parking space that is suitable as the target parking space. It appears that the time required for the parking process is shorter (the parking-related cost is lower) when parking into the first parking space detected under the current condition (position) than when parking into the first parking space detected under the past condition (position). In other words, when the automated parking is performed, parking into the first parking space detected under the current condition (position) is more convenient than parking into the first parking space detected under the past condition (position).

Hereinafter, the parking assist apparatus 100 according to one or more embodiments of the present invention and the parking assist method used therein will be specifically described. This parking assist method includes a process of specifying a parking space (target parking space) into which the subject vehicle V is actually parked. One or more embodiments of the present invention relate to a control method in the case in which a parking space other than the parking space (its examples include the above-described available parking spaces and recommended parking space, here and hereinafter) detected by the parking assist apparatus 100 is selected by the driver.

The parking assist apparatus 100 according to one or more embodiments of the present invention detects parking spaces using the images captured by the cameras 1*a* to 1*d* and the ranging information from the ranging device 3.

However, depending on the arranged positions of the cameras 1*a* to 1*d*, the image capturing environment, the processing method performed by the image processing device 2, the arranged position of the ranging device 3, and the size and position of a three-dimensional object, parking spaces may not be detected as available parking spaces even though they are actually available.

In such cases, an available parking space (its examples include the above-described available parking spaces and recommended parking space, here and hereinafter) which the parking assist apparatus 100 presents to the driver may not be specified by the driver, and another parking space may be specified by the driver. This is because the driver can confirm an available parking space by the driver's own visual/auditory sense.

The driver may make a selection input of a parking space which the parking assist apparatus 100 presents as an unavailable parking space (a parking space other than the parking space which the parking assist apparatus 100 presents as being available), as the target parking space.

If the processing of the parking assist apparatus 100 is constrained by its detection result, processing in accordance with the selection input by the driver cannot be executed.

Thus, a problem is that the driver may feel troublesome that, even though the driver makes a selection input of the target parking space determined by the driver, the parking assist apparatus 100 does not operate in accordance with the driver's selection input.

In one or more embodiments of the present invention, when a second parking space other than the first parking space detected by the parking assist apparatus 100 is selected by the driver, the detection process for the first parking space is performed again. For example, depending on the parking environment and the surrounding environment of the subject vehicle when parking the vehicle, the parking condition may not be satisfied even in a parking space (its examples include the available parking spaces and the recommended parking space) that is suitable for parking. Such a parking space may not be detected as the first parking space (available parking space). It may be troublesome for the driver that, even though the driver can confirm a parking space suitable for parking, the parking assist apparatus 100 does not display the parking space as an available parking space. When the driver selects a second parking space other than the first parking space, the control device 10 determine again whether or not the parking space satisfies the parking condition, and detects the parking space satisfying the parking condition as the first parking space. By detecting parking spaces again, a parking space that was not able to be detected at the previous time may possibly be detected as the first parking space. "Executing the detection process again" will be referred to as "re-detection" or its derivatives, here and hereinafter.

Although not particularly limited, the control device 10 executes the re-detection process for parking spaces on the second parking space other than the first parking space selected based on the result of the previous detection process. That is, a determination is made as to whether or not the second parking space satisfies a predetermined parking condition, and when the second parking space satisfies the predetermined parking condition, the second parking space is detected (specified) as the first parking space. As will be understood, parking spaces to be subjected to the re-detection process may not be limited.

Control processes executed in the parking assist apparatus 100 according to one or more embodiments of the present invention will be described below with reference to FIGS. 8 to 13. FIGS. 8 to 11 are flowcharts illustrating the control processes executed in the parking assist apparatus 100 according to one or more embodiments of the present invention. The flowcharts of FIGS. 8 to 11 each represent a process when the target parking space is input by the driver in step 106 illustrated in FIG. 2. Here, the parking space to be subjected to the process may be any of the available parking spaces detected in step 103 of FIG. 2 and the recommended parking space detected in step 104 of FIG. 2. The actions and effects of one or more embodiments of the present invention can be obtained in any case in which the parking space to be subjected to the process is an "available parking space" or a "recommended parking space(s)."

FIG. 8 is a flowchart illustrating a first control example. In step S1, the control device 10 determines whether or not the target parking space input by the driver in step 106 illustrated in FIG. 2 is the parking space presented in step 105. When the target parking space input by the driver is other than the parking space presented, the routine proceeds to step S3. On the other hand, when the target parking space input by the driver is the parking space presented, the routine proceeds to step S2, and the process of step 107 of FIG. 2 and subsequent processes are executed.

When a second parking space other than the first parking space is selected by the driver in step S1, the control device 10 according to one or more embodiments of the present invention controls the subject vehicle V to approach the second parking space (target parking space Mo) which is input by the driver. The control device 10 directs the subject vehicle V to the second parking space for a while in accordance with the instruction by the driver. The control device 10 transmits the position of the input target parking space Mo to the vehicle controller 30. The vehicle controller 30 uses the drive system 40 and the steering angle sensor 50 to move the subject vehicle V so that it approaches the target parking space Mo. The movement of the subject vehicle V may be movement by the automated driving as described above or movement by the driver's operation.

The control device 10 executes re-detection (processes of step S3 and subsequent steps) while the subject vehicle V is moving. As approaching the object to be detected, more accurate captured images/ranging data can be obtained. The re-detection process of step S3 and subsequent steps is performed when moving to the target parking space Mo which the driver desires, and more accurate detection results for the target parking space Mo can thereby be obtained.

From the same viewpoint, when a second parking space is selected by the driver, the control device 10 executes the re-detection at timing at which the subject vehicle V approaches the selected second parking space. The timing at which the subject vehicle V approaches a second parking space may be timing at which the distance between the subject vehicle V and the second parking space becomes a predetermined value or less or timing at which a predetermined time has passed after the timing at which the second parking space is selected by the driver. The re-detection process of step S3 and subsequent steps is performed after approaching the target parking space Mo which the driver desires, and more accurate detection results for the target parking space Mo can thereby be obtained.

This process is preferably executed after the recommended parking space is detected in step 104. When a first parking space among the available parking spaces that satisfies the parking condition in relation to the subject vehicle V is detected as the recommended parking space and thereafter the driver selects a second parking space other than the first parking space, the control device 10 re-detects the first parking space (another first parking space). It appears that the accuracy of detection results is high at the stage at which the recommended parking space is extracted from the available parking spaces. The re-detection process is performed at this stage thereby to prevent the execution frequency of the re-detection process from being unduly high, and the reliability of the parking assist apparatus 100 can be improved.

In step S3, the control device 10 lowers the criteria of the parking condition (relaxes the criteria) and executes the re-detection. The control device 10 determines whether or not the re-detection process with the lowered criteria can detect the input target parking space as a parking space into which parking is possible. When the control device 10 determines that parking is possible into the input target parking space, the routine proceeds to step S6, in which the input target parking space is set as a parking target. Step 6 is followed by step S2, and the process of step S107 of FIG. 2 and subsequent processes are executed. After step S3, the output device 20 may be used to present the results of the re-detection process.

When, in step S3, the control device 10 cannot detect the input target parking space as a parking space into which parking is possible, the routine proceeds to step S7. In step S7, the driver is requested to re-input a target parking space. The output device 20 may be used to present the request for re-input.

In one or more embodiments of the present invention, when the driver selects a second parking space other than the first parking space detected by the parking assist apparatus 100, the detection process for a first parking space is performed again. This can increase the possibility of parking into a parking space that was not detected as an available parking space despite the fact that the parking space is actually available.

The re-detection process of step S3 will be described. The control device 10 executes the re-detection process for a certain region in the vicinity of the second parking space which is selected by the driver. The purpose of the re-detection process is to re-detect whether or not parking is possible into the second parking space which was not able to be detected once as a parking space into which parking is possible. The detection process is performed for the region in the vicinity of the second parking space, and the re-detection process can thereby be efficiently performed.

In the process of re-detecting a first parking space (its examples include the available parking spaces and the recommended parking space, here and hereinafter), the control device 10 according to one or more embodiments of the present invention changes the above-described parking condition so that the first parking space can be readily detected.

In the process of re-detecting a first parking space (available parking space, recommended parking space), the control device 10 according to one or more embodiments of the present invention changes at least a part of the parking condition so that the first parking space can be readily detected. The control device 10 re-detects a parking space under a different parking condition with regard to the second parking space which was not able to be detected at the previous time as a parking space into which parking is possible.

In a first process of changing the parking condition, the control device 10 reduces the above-described items of the "parking condition." By reducing the number of items defined as the parking condition, the first parking space can be readily detected and it is therefore possible to detect a first parking space that was not able to be detected at the first detection process.

In a second process of changing the parking condition, the previous detection result is ignored with regard to a certain parking condition. When, in the previous detection process for a first parking space, the control device 10 determines that the second parking space selected by the driver is already used for parking or an obstacle is present in the second parking space, the control device 10 determines, in the process of re-detection, that the second parking space is empty or no obstacle is present in the second parking space. In other words, on the assumption of the fact that the driver selects the second parking space after visually confirming that the second parking space is available, the "detection result of being already used for parking" and the "detection result that an obstacle is present" are treated to be ignored.

Detection results of three-dimensional objects including other vehicles and obstacles are liable to be affected by the surrounding situation for image capture. At a location under strong sunlight, a determination may be made that a three-dimensional object exists, on the basis of the boundary between light and shadow. At a location with a puddle after rain, a determination may be made that a three-dimensional object exists, on the basis of reflected light from the water surface. At a location with illumination, a determination may be made that a three-dimensional object exists, on the basis of illumination at night. Thus, there are a variety of disturbance modes to the determination of three-dimensional object based on the captured images, which may be difficult to cope with. It is preferred to give importance to the existence of a parking space with no obstacles/empty parking space which the driver himself/herself visually confirms.

In one or more embodiments of the present invention, the "detection result of being already used for parking" and the "detection result that an obstacle is present" are discarded with regard to the target parking space from the driver. Re-detection as to whether or not a parking space is empty/ an obstacle exists can be performed for the second parking space which was not able to be detected as a parking space into which parking is possible, due to the effect of disturbance to the image capture environment.

In a third process of changing the parking condition, the control device 10 changes the above-described "threshold" of the "parking condition" so that the first parking space can be readily detected. Specific examples will be described below.

1. With Regard to Detection of Parking Frame Lines

The threshold is changed as below thereby to allow the parking frame lines to be readily detected.

(1) The threshold of the luminance difference of edges is reduced.

(2) The range of the threshold of a line angle is expanded.

(3) The range of the threshold of a line width is expanded.

(4) The threshold of the length of a continuous edge (line) is reduced.

(5) The threshold of the luminance difference of noise between lines is reduced.

(6) The threshold of the likelihood representing the probability as parking frame lines calculated based on the assessment/evaluation values of the above (1) to (5) is reduced.

2. With Regard to Detection of Parking Spaces

The threshold is changed as below thereby to allow the parking space to be readily determined.

(1) The threshold of the length of a line to be excluded from the candidates of parking frame lines is increased.

(2) The threshold (upper limit/lower limit) of the length of a line to be a candidate of the parking frame line is changed.

3. With Regard to Determination Whether Parking is Possible or not

The threshold is changed as below thereby to allow for easy determination that parking is possible.

(1) The region to be determined is expanded.

(2) The threshold for determination that the parking space is empty is reduced (determination of an empty space is made easy).

(3) The threshold for determination that an obstacle exists is reduced (determination of no obstacles is made easy).

4. With Regard to Criteria for Recommendation of Parking

The threshold is changed as below thereby to allow for easy recommendation.

(1) The threshold of the number of turns for parking is reduced.

(2) The threshold of the time required for parking is reduced.

(3) The threshold of the travel distance required for parking is reduced.

Thus, the threshold of the parking condition for detecting the first parking space (available parking space, recommended parking space) is adjusted. Through this operation, with regard to the second parking space which was not able to be detected as a parking space into which parking is possible, due to the effect of disturbance to the image capture environment, the effect of the position, size, etc. of an obstacle, the effect of the image capture range, and the like, re-detection can be performed as to whether or not the parking space is available.

FIG. 9 is a flowchart illustrating a second control example. Processes of steps S1, S2, S3, S6, and S7 are common to those of the first control example described with reference to FIG. 8, and the above description will be borrowed herein.

When the control device 10 determines that the target parking space input by the driver in step 106 illustrated in FIG. 2 is other than the parking space presented, the routine proceeds to step S3. In step S3, the control device 10 lowers the criteria of the parking condition (relaxes the criteria) and determines whether or not the parking space can be detected, on the basis of the parking condition with the lowered criteria. When the parking space can be detected in the re-detection, the routine proceeds to step S4 in which the results of the re-detection are displayed. The display form is not limited. Alternatively, the routine may proceed to step S5 without such display.

In step S5, the control device 10 determines whether or not the turn-on operation of the input device 5 is continued. The control apparatus 10 according to one or more embodiments of the present invention sets the second parking space as the target parking space Mo. When a determination is made that the input of the selection information of the second parking space is continuously performed via the input device 5, the control device 10 assists parking into the target parking space Mo. Whether or not the pressing of the input device 5 is continued may be determined by the continuity of the selection signal which is input using the input device 5. Although not particularly limited, in one or more embodiments of the present invention, a Deadman switch 51 is used as the input device 5.

Only when the deadman switch 51 is in the turned-on operation state, the control device 10 sets the parking space associated with the selection input by the driver as the target parking space Mo and assists parking into the target parking space Mo. Thus, only when the driver continues the selection input operation, the parking assist process for parking the subject vehicle V into the target parking space Mo, which is the selected object, is continuously performed, and the parking assist process can therefore be executed in accordance with the driver's intention.

In one or more embodiments of the present invention, with regard to the parking space which was not able to be detected, the determination by the driver based on visual confirmation is given importance, and when the driver inputs the selection information of a second parking space, the second parking space is set as the target parking space Mo. Moreover, while the selection information of the second parking space is being continuously input via the input device 5, the control device 10 estimates that the driver confirms that parking is possible into the second parking space, and continues the parking assist process for parking the subject vehicle V into the target parking space Mo. Through this operation, even when the detection result is not accurate, the detection result can be corrected on the basis of the input information to execute appropriate parking assist.

FIG. 10 is a flowchart illustrating a third control example. This control example is an example when the driver outside the vehicle operates the parking assist apparatus 100 of the subject vehicle V using a portable input device 5. Processes of steps S1, S2, S3, S4, S6, and S7 are common to those of the first and second control examples described with reference to FIGS. 8 and 9, and the above description will be borrowed herein.

The control device 10 lowers the criteria of the parking condition (relaxes the criteria) to determine whether or not the parking space can be detected, on the basis of the parking condition with the lowered criteria (step S3), and displays the results of the re-detection (step S4).

In step S51, the control device 10 determines whether the driver (or passenger) is present inside the vehicle or outside the vehicle. When the driver or passenger is present inside the vehicle, the routine proceeds to step S5. This process is common to step S5 of FIG. 9. In addition, the control device 10 according to one or more embodiments of the present invention acquires the input information from the input device 5 which can be carried outside the vehicle. The control device 10 can use the information received from the portable input device 5 to determine whether or not the turn-on operation of the input device 5 is continued.

When the selection information of a second parking space is input via the portable input device 5, the control device 10 sets the second parking space as the target parking space Mo. Moreover, while the selection information of the second parking space is being continuously input via the portable input device 5, the control device 10 estimates that the driver confirms that the second parking space is available, and continues the parking assist process for parking the subject vehicle V into the target parking space Mo. Through this operation, even when the detection result is not accurate, the detection result can be corrected on the basis of the information, which is input via the portable input device 5, to execute appropriate parking assist.

The fourth control example starts with the re-detection process of step S3 illustrated in FIGS. 8 to 10. In step S12 of FIG. 11, the control device 10 performs the re-detection process when the target parking space input by the driver in step 106 illustrated in FIG. 2 is other than the parking space presented. This re-detection process may be executed when moving toward the target parking space Mo specified by the driver or may also be executed after approaching within a predetermined distance from the target parking space Mo.

In step S13, the control device 10 determines whether or not parking is possible into the target parking space Mo specified by the driver. The control device 10 re-detects the existence of another parked vehicle and the existence of an obstacle with respect to the target parking space Mo specified by the driver. When parking is possible into the target parking space Mo, the control device 10 calculates the route in step S14. Further, in step S15, the control device 10 determines whether or not the subject vehicle V can follow the calculated route to move, that is, whether no obstacle is present on the route. When parking is possible into the target parking space Mo specified by the driver (Yes in S13) and the subject vehicle V can move along the route (Yes in S15), the routine proceeds to step S16, and the process of S107 illustrated in FIG. 2 and subsequent processes are executed.

When, in step S13, a determination is made that an obstacle is present in the target parking space Mo specified by the driver and parking is not possible or when, in step S15, an obstacle is present on the calculated route and movement is not possible, the routine proceeds to step S17.

This situation represents a scene in which the parking assist apparatus 100 determines that execution of the parking process is difficult when the subject vehicle V actually approaches the target parking space Mo or when the subject vehicle V tries to park into the target parking space Mo. A first example of this type of scene is a case in which an obstacle cannot be detected because the obstacle is hidden due to a relatively long distance between the subject vehicle V and the target parking space Mo, but when the subject vehicle V approaches the target parking space Mo, the hidden obstacle is detected in or in the vicinity of the target parking space Mo. A second example is a case in which, when the subject vehicle V is far from the target parking space Mo, a determination is made that the parking control can be executed (the parking control will be executed), but when the subject vehicle V actually approaches the target parking space Mo or when the parking control into the target parking space Mo is started, a determination is made that parking is not possible into the target parking space Mo.

Specifically, it is now assumed that, when the parking space PL8 illustrated in FIG. 4A is selected as the target parking space, execution of the parking control is determined because the parking space PL8 is empty. Thereafter, when the subject vehicle V approaches the parking space PL8 or when the parking control into the parking space PL8 is started, a determination may be made that a route for parking cannot be derived due to the existence of the wall W.

However, fortunately, even in a situation that obliges abandonment of parking the subject vehicle V into the target parking space Mo, the control device 10 according to one or more embodiments of the present invention can prevent giving up the execution of the parking assist process. In other words, the control device 10 according to one or more embodiments of the present invention continues the parking assist process for the subject vehicle V until the subject vehicle V enters any of parking spaces.

In particular, the control device 10 according to one or more embodiments of the present invention executes the process in accordance with the situation, such as whether the parking assist process is in a manual parking mode, an automated parking mode, a remote parking mode, an on-board parking mode, or the like. The process will be described below.

In step S17, the control device 10 queries the driver as to whether or not to switch to the "manual parking mode." That is, the control device 10 confirms whether the driver tries manual parking. FIG. 12A illustrates a display example of a message for confirmation. The message for confirmation may be displayed on the display of the input device 5.

The "manual parking mode" in one or more embodiments of the present invention refers to a mode in which the driver of the subject vehicle V executes any one or more of the steering operation and the brake/accelerator operation. Examples of the "manual parking mode" also include a semiautomatic-type parking mode in which the parking assist apparatus 100 executes a part of the operation.

The "automated parking mode" refers to a mode in which the driver of the subject vehicle V does not execute any of the steering operation and the brake/accelerator operation and the parking assist apparatus 100 (including associated on-board devices) of the subject vehicle V executes the entire parking process.

The "automated parking mode" can be utilized both when the driver is aboard the subject vehicle V and when the driver is not aboard the subject vehicle V. In the "remote parking mode" when the driver is not aboard the subject vehicle V, the previously-described portable input device 5 can be used to input commands to the parking assist apparatus 100 of the subject vehicle V thereby to remotely control the parking operation of the subject vehicle V.

When the "manual parking mode" is selected in step S17, the routine proceeds to step S18. In step S18, the control device 10 determines whether or not the subject vehicle V is in the "remote parking mode." Whether or not the subject vehicle V is in the remote parking mode may be determined on the basis of the mode selection information which is preliminarily input or may also be determined on the basis of the location of the input device 5. The parking assist apparatus 100 continues the communication with the input device 5 at a predetermined period. The control device 10 can determine that the input device 5 exists outside the subject vehicle V on the basis of whether or not the communication with the input device 5 is possible.

When, in step S18, a determination is made that the subject vehicle V is not in the remote parking mode, it is considered that the driver is aboard the subject vehicle V. In this case, the routine proceeds to step S21. The control device 10 leaves the execution of the parking process to the driver at that location. FIG. 12B illustrates a display example of a message of switching to the manual parking.

When, in step S18, a determination is made that the subject vehicle V is in the remote parking mode, it is considered that the driver is not aboard the subject vehicle V. In this case, the routine proceeds to step S19.

Provided that the subject vehicle V is in the remote parking mode in which the input device 5 is located outside the subject vehicle V, when a determination is made that the first parking space does not satisfy the parking condition, the control device according to one or more embodiments of the present invention executes a process of moving the subject vehicle V to a switching position that is determined on the basis of the position of the input device 5.

In step S19, the control device 10 calculates the switching position at which the subject vehicle V switches to the manual parking mode. The switching position is a position that is suitable for leaving the control initiative of the parking assist process for the subject vehicle V to the driver. At the switching position, the control device 10 switches the parking mode of the parking assist apparatus 100 to the manual parking mode. That is, the control device 10 continues the control of the parking assist process until the subject vehicle V arrives at the switching position.

The control device 10 calculates the "switching position" from the following viewpoints.

(1) The switching position should be at a location at which the driver can easily board.

(2) The switching position should be at a location that does not interfere with the movement of other vehicles and pedestrians.

(3) The switching position should be at a location that allows the parking process to be readily performed in the manual parking mode.

The above items (1) to (3) will be described.

The "location at which the driver can easily board" is obtained from the following viewpoints.

(a) The distance from the current position of the driver should be short. The current position of the driver is determined on the basis of the position of the input device 5 carried by the driver.

(b) The door can be opened and closed. The determination is made with consideration for the space in which the door at the driver's sheet side can be opened.

The "location that does not interfere with the movement of other vehicles and pedestrians" is obtained from the following viewpoints.

(a) No other vehicles and pedestrians exist.

(b) The location should not interfere with the passage of other vehicles and pedestrians.

The "location that allows the parking process to be readily performed in the manual parking mode" is obtained from the following viewpoints.

(a) The location should be close to a parking space with sufficient margin.

(b) Adjacent parking space or spaces are empty.

(c) A region for operation in the vicinity of the parking space (region in which the vehicle can travel for parking) is wide.

The control device 10 may calculate a location that satisfies all of the above items (1) to (3) as the switching position or may also calculate a location that satisfies one or more of the (1) to (3) as the switching position.

Although not particularly limited, an example of calculation of the switching position will be described. The control device 10 calculates a route from the position of the subject vehicle V when a determination is made that parking into the target parking space Mo is not possible to the position of the input device 5 carried by the driver. On this route, the control device 10 detects areas in which other vehicles and pedestrians do not exist and/or which do not interfere with the passage of other vehicles and pedestrians. The control device 10 extracts areas having a size that allows the subject vehicle V to stop and allows the door at the driver's sheet side to be opened. The control device 10 sets priorities to these areas in the order of their proximity to the input device 5 (i.e. the driver). The control device 10 preferentially extracts a wide parking space or a parking space with empty neighbors from among the areas having high priority. The position corresponding to the extracted parking space is employed as the switching position.

The control device 10 transmits the positional information of the switching position or the map indicating the position of the switching position to the input device 5. FIG. 12C illustrates a display example of a message conveying the switching position. This message is displayed on the display of the input device 5.

In step S20, after transmitting the above message conveying the switching position, the control device 10 moves the subject vehicle V to the switching position. The movement to the switching position may be started after receiving the acknowledgment signal from the input device 5.

Referring again to step S17, when the "manual parking mode" is not selected, the routine proceeds to step S22. The process of step 22 and subsequent processes are those when the "automated parking mode" is selected. FIG. 13A illustrates a display example of a message for confirmation. The message for confirmation may be displayed on the display of the input device 5.

In step S22, the control device 10 determines whether or not the driver selects another parking space. Another parking space as used herein refers to a parking space other than the target parking space Mo which is determined in step S13 as an object of the re-detection. When another parking space is selected, the routine proceeds to step S28 in which the control device 10 determines whether or not the selected parking space is an available parking space (or a recommended parking space). When the selected parking space is an available parking space or a recommended parking space, the routine proceeds to step S29 in which the subject vehicle V is parked in the parking space. When the selected parking space is not any of an available parking space or a recommended parking space, the routine returns to step S12 from which the selected parking space is re-detected.

When, in step S22, the control device 10 determines that the driver does not select another parking space, the routine proceeds to step S23. When no parking space is selected, it is considered that the driver determines not to park, and it is therefore preferred to end the parking assist process.

Examples of a scene in which the driver does not select another parking space include a scene in which the driver desires to park the subject vehicle V into a parking space that is farther than the parking spaces which the driver can select (a parking space that is not displayed in the selection screen). In one or more embodiments of the present invention, a processing process in such a scene is proposed.

When, as a result of the re-detection, a determination is made that the second parking space does not satisfy the parking condition (No in step S13, No in step S15), the control device 10 according to one or more embodiments of the present invention presents a parking space that is located farther from the subject vehicle V than selectable parking spaces as a parking space that can be selected. The driver can select one target parking space Mo from among parking spaces presented as those which can be selected. As a result of the re-detection, the second parking space (target parking space Mo) specified by the driver may not satisfy the parking condition. If there is no other selectable parking space, the parking assist process may become deadlocked. Also in a situation in which, as a result of the re-detection, the second parking space (target parking space Mo) specified by the driver does not satisfy the parking condition, the driver may desire to go to find a distant parking space.

When, as a result of the re-detection, the second parking space (target parking space Mo) specified by the driver does not satisfy the parking condition, the control device 10 according to one or more embodiments of the present invention expands the region of selectable parking spaces toward the travel direction of the subject vehicle V. As a result, options of parking spaces increase than at present. This can present new options (parking spaces that can be selected) to the driver even in a scene in which the second parking space (target parking space Mo) specified by the driver does not satisfy the parking condition and a parking space cannot be selected. This allows the parking assist process to continue.

In one or more embodiments of the present invention, a query is made as to whether the driver desires to park the subject vehicle V at a parking space that is farther than the parking spaces which the driver can select (a parking space that is not displayed in the selection screen). For example, the only empty parking space is presented in addition to the target parking space Mo into which parking is not possible, but the driver may refuse to park there and desire to park in a further distant parking space. In one or more embodiments of the present invention, as illustrated in FIG. 13B, another parking space into which parking is possible is presented, and a query is made as to whether or not to park. When "No" is input in response to the query "Park here?" the control device 10 expands the region of selectable parking spaces ahead of the subject vehicle V and presents a parking space other than the parking space, which is currently displayed, as a parking space that can be selected.

Thus, when the driver desires to park the subject vehicle V at a parking space that is not displayed in the selection screen (a parking space that is farther than the selectable parking spaces), the control device 10 expands the selectable range and presents a parking space that belongs to the expanded new selectable range, as a parking space that can be selected. In step S22, the case in which no parking space is selected may be represented by a case in which the operation input from the driver is not made for a predetermined time or more.

In step S23, the control device 10 presents parking spaces other than the parking spaces displayed on the selection screen to the driver. The control device 10 performs the process of step S24 and subsequent steps to move to another parking space selected by the driver.

Step S23 is followed by step S24 in which the control device 10 determines whether or not the subject vehicle V is in the "remote parking mode." The process of determining whether or not the subject vehicle V is in the remote parking mode is common to that of step S18.

When, in step S24, a determination is made that the subject vehicle V is not in the remote parking mode, it is considered that the driver is aboard the subject vehicle V, so the routine proceeds to step S27.

When, in step S24, a determination is made that the subject vehicle V is in the remote parking mode, it is considered that the driver is not aboard the subject vehicle V. In this case, the routine proceeds to step S25.

In step S25, the control device 10 calculates the switching position at which the parking mode is switched to the manual parking mode. The switching position is a position that is suitable for leaving the control initiative of the parking assist process for the subject vehicle V to the driver. The switching position can be obtained using the process described in step S19.

The control device 10 transmits the positional information of the switching position or the map indicating the position of the switching position to the input device 5. FIG. 13C illustrates a display example of a message conveying the switching position. This message is displayed on the display of the input device 5.

In step S26, after transmitting the above message which conveys the switching position as illustrated in FIG. 13C, the control device 10 moves the subject vehicle V to the switching position. The movement to the switching position may be started after receiving the acknowledgment signal from the input device 5.

Thus, according to the parking assist apparatus 100 in one or more embodiments of the present invention, even in a situation that obliges abandonment of parking the subject vehicle V into the target parking space Mo, it is possible to prevent giving up the execution itself of the parking assist process. When the parking assist process is executed in the remote parking mode, the switching position suitable for switching to the manual parking mode is calculated on the basis of the location of the input device 5 used for the remote control, and the control initiative of the parking assist process for the subject vehicle V is left to the driver at the switching position. This can increase the possibility that the parking assist apparatus 100 can complete the parking assist process.

The parking assist method according to one or more embodiments of the present invention is used in a parking assist apparatus as the above and therefore has the following effects. The parking assist apparatus 100 according to one or more embodiments of the present invention is configured and operates as the above and therefore has the following effects.

(1) According to the parking assist method in one or more embodiments of the present invention, a first parking space that satisfies a predefined parking condition is detected, and when information of selecting a second parking space other than the first parking space is input, re-detection of a parking space that satisfies the parking condition is executed again. This can find out the possibility that the subject vehicle V can be parked into a parking space that was not detected as an available parking space despite the fact that the parking space is actually available.

(2) According to the parking method in one or more embodiments of the present invention, in the process of re-detecting the first parking space, a determination is made as to whether the second parking space for which the information of selection is input satisfies the parking condition, and the second parking space satisfying the parking condition is detected as the first parking space. This limits the detection region for the first parking space and can reduce the detection time.

(3) According to the method in one or more embodiments of the present invention, in the process of re-detecting the first parking space, a part of conditions included in the parking condition is changed so that the parking space is readily detected. Thus, in the process of re-detecting the first parking space (available parking space, recommended parking space), the control device 10 of the parking assist apparatus 100 changes at least a part of the parking condition so that the parking space is readily detected. With regard to the second parking space which was not able to be detected once as a parking space into which parking is possible, whether or not parking is possible can be reconfirmed under a different parking condition.

(4) According to the method in one or more embodiments of the present invention, in the process of re-detecting the first parking space, a threshold of the parking condition is changed so that the first parking space is readily detected. Thus, the threshold of the parking condition for detecting the first parking space (available parking space, recommended parking space) is adjusted. Through this operation, with regard to the second parking space which was not able to be detected as a parking space into which parking is possible, due to the effect of disturbance to the image capture environment, the effect of the position, size, etc. of an obstacle, the effect of the image capture range, and the like, reconfirmation can be made as to whether or not the parking space is available.

(5) According to the method in one or more embodiments of the present invention, when re-detecting the first parking space, a certain region in the vicinity of the second parking space selected by a driver is re-detected. The control device 10 executes the re-detection process for the certain region in the vicinity of the second parking space. The detection process is performed for the region in the vicinity of the second parking space, and the re-detection process can thereby be efficiently performed.

(6) According to the method in one or more embodiments of the present invention, when a determination is made that the second parking space selected by the driver is already used for parking or an obstacle exists in the second parking space in the detection of the first parking space, a determination is made that the second parking space is empty or no obstacle exists in the second parking space in the process of re-detection. In one or more embodiments of the present invention, the "detection result of being already used for parking" and the "detection result that an obstacle is present" are discarded with regard to the target parking space from the driver. This allows reconfirmation to be made as to whether or not the parking space is empty for the second parking space which was not able to be detected as a parking space into which parking is possible, due to the effect of disturbance to the image capture environment.

(7) According to the method in one or more embodiments of the present invention, when the second parking space is selected by the driver, the re-detection is executed while the subject vehicle is moving. The re-detection process is performed when moving to the target parking space Mo which the driver desires, and more accurate detection results for the target parking space Mo can thereby be obtained.

(8) According to the method in one or more embodiments of the present invention, when the second parking space is selected by the driver, the control device 10 executes the re-detection at the timing when the subject vehicle V approaches the selected second parking space. The re-detection process is performed after approaching the target parking space Mo which the driver desires, and more accurate detection results for the target parking space Mo can thereby be obtained.

(9) According to the method in one or more embodiments of the present invention, when a first parking space among the available parking spaces that satisfies the parking condition in relation to the subject vehicle V is detected as the recommended parking space and thereafter the driver selects a second parking space other than the first parking space, the control device 10 re-detects the first parking space (another first parking space). It appears that the accuracy of detection results is high at the stage at which the recommended parking space is extracted from the available parking spaces. The re-detection process is performed at this stage thereby to prevent the execution frequency of the re-detection process from being unduly high. Thus, the execution frequency of the re-detection process can be suppressed thereby to improve the reliability of the parking assist apparatus 100. Moreover, the processing const can be reduced because the re-detection process is performed only for appropriate scenes.

(10) According to the method in one or more embodiments of the present invention, the input device 5 capable of exchanging a signal with the parking assist apparatus 100 is further provided. When a determination is made that the input of the selection information of the second parking space is continuously performed via the input device 5, the second parking space is set as the target parking space, and the parking into the target parking space is assisted. Only when the deadman switch 51 is in the turned-on operation state, the control device 10 sets the parking space associated with the selection input by the driver as the target parking space Mo and assists parking into the target parking space Mo. Thus, only when the driver continues the selection input operation, the parking assist process for parking the subject vehicle V into the target parking space Mo, which is the selected object, is continuously performed, and the parking assist process can therefore be executed in accordance with the driver's intention.

(11) According to the method in one or more embodiments of the present invention, the input device 5 capable of exchanging a signal with the parking assist apparatus 100 is further provided, and the parking assist apparatus 100 is used. The parking assist apparatus 100 includes the input device 5 which is portable and capable of exchanging information with the control device 10. The parking assist process for the subject vehicle V can therefore be remotely controlled.

(12) In one or more embodiments of the present invention, the input device 5 capable of exchanging information with the parking assist apparatus 100 is further provided, and a method of parking assist when the input device 5 is located outside the subject vehicle V (i.e. when remote control is performed) is proposed. When, as a result of the re-detection of the second parking space, a determination is made that the second parking space does not satisfy the parking condition, the control device 10 according to one or more embodiments of the present invention moves the subject vehicle V to the switching position which is determined on the basis of the location of the input device 5. When the parking assist process is executed in the remote parking mode, the switching position suitable for switching to the manual parking mode is calculated on the basis of the location of the input device 5 used for the remote control, and the control initiative of the parking assist process for the subject vehicle V is left to the driver at the switching position. This can increase the possibility that the parking assist apparatus 100 can complete the parking assist process.

(13) According to the method in one or more embodiments of the present invention, when, as a result of the re-detection, a determination is made that the second parking space does not satisfy the parking condition, a query is made to the driver or passenger as to whether to manually park into the second parking space. This can encourage the driver or passenger to try manual parking even when it is difficult for the parking assist apparatus 100 to complete the parking into the second parking space. The possibility of parking into the second parking space can therefore be increased.

(14) According to the method in one or more embodiments of the present invention, when, as a result of the re-detection, a determination is made that the second parking space does not satisfy the parking condition, a parking space that is located farther than selectable parking spaces with reference to the subject vehicle V is presented as a parking space that can be selected. This can present new options (parking spaces that can be selected) to the driver even in a scene in which, as a result of the re-detection, the second parking space (target parking space Mo) specified by the driver does not satisfy the parking condition and a parking space cannot be selected. This allows the parking assist process to continue.

(15) The above-described parking assist method/method of displaying parking assist information can be carried out using the parking assist apparatus 100 according to one or more embodiments of the present invention. The parking assist apparatus 100 according to one or more embodiments of the present invention therefore has the above-described actions and effects.

Embodiments heretofore explained are described to facilitate understanding of the present invention and are not described to limit the present invention. It is therefore intended that the elements disclosed in the above embodiments include all design changes and equivalents to fall within the technical scope of the present invention.

That is, in the present description, an example of the parking assist apparatus 100 having the control device 10, the display 21, and the input device 5 is described as an embodiment of the parking assist apparatus according to the present invention, but the present invention is not limited to this.

REFERENCE SIGNS LIST

1000 Parking assist system
100 Parking assist apparatus
  10 Control device
  11 CPU
  12 ROM
  13 RAM
  20 Output device
  21 Display
1a-1d Onboard cameras
2 Image processing device
3 Ranging device
5 Input device
30 Vehicle controller
40 Drive system
50 Steering angle sensor
60 Vehicle speed sensor
  V Subject vehicle
  Me Available parking space, Parking available mark
  Mr Recommended parking space, Recommendation mark
  Mo Target parking space

The invention claimed is:

1. A parking assist method comprising a method of displaying parking assist information, the method being used in a parking assist apparatus comprising a control device, the control device being configured to:
execute a detection process for a parking space that satisfies a predefined parking condition;
when the parking space satisfying the parking condition is detected, detect the parking space as a first parking space; and
when information of selecting a second parking space other than the first parking space is input, change the predefined parking condition, re-execute the detection process for the parking space, and detect the parking space satisfying the changed parking condition as the first parking space.

2. The parking assist method according to claim 1, wherein, in the re-executed detection process for the parking space, a part of conditions included in the parking condition is changed so that the parking space is readily detected.

3. The parking assist method according to claim 1, wherein, in the re-executed detection process for the parking space, a threshold of the parking condition is changed so that the parking space is readily detected.

4. The parking assist method according to claim 1, wherein, in the re-executed detection process for the parking space, a certain region in a vicinity of the second parking space selected by a driver is re-detected.

5. The parking assist method according to claim 1, wherein, when a determination is made that the second parking space is already used for parking in the detection process for the parking space, the determination is made that the second parking space is empty in the re-executed detection process for the parking space.

6. The parking assist method according to claim 1, wherein the control device is configured to, when the information of selecting the second parking space is input, re-execute the detection process for the parking space while a subject vehicle is moving.

7. The parking assist method according to claim 1, wherein the control device is further configured to:
detect available parking spaces into which parking is possible; and
when the first parking space among the available parking spaces which satisfies a parking recommendation condition included in the parking condition is detected as a recommended parking space and thereafter information that a driver selects the second parking space other than the first parking space is input, re-execute the detection process.

8. The parking assist method according to claim 1, wherein an input device capable of exchanging a signal with the parking assist apparatus is further provided, and the control device is configured to:
set the second parking space as a target parking space via the input device; and
when a determination is made that input of selection information of the second parking space is continuously performed, assist parking into the target parking space.

9. The parking assist method according to claim 8, wherein the input device is portable and capable of exchanging information with the parking assist apparatus.

10. The parking assist method according to claim 1, wherein an input device capable of exchanging information with the parking assist apparatus is further provided, and
the control device is configured to, when the input device is located outside a subject vehicle and a determination is made that the first parking space does not satisfy the parking condition as a result of the re-detection, move the subject vehicle to a switching position that is determined on a basis of a position of the input device.

11. The parking assist method according to claim 1, wherein the control device is configured to, when a determination is made that the second parking space does not satisfy the parking condition as a result of the re-detection, request a driver or passenger to input whether or not to manually park into the second parking space.

12. The parking assist method according to claim 1, wherein the control device is configured to, when a determination is made that the second parking space does not satisfy the parking condition as a result of the re-detection, present a parking space located farther from a subject vehicle than a selectable parking space as a parking space that can be selected.

13. The parking assist method according to claim 1, wherein the control device is configured to execute the detection process using a camera or ranging device provided at the vehicle or an external server.

14. A parking assist method used in a parking assist apparatus comprising a control device, the control device being configured to:

execute a detection process for a parking space that satisfies a predefined parking condition;

when the parking space satisfying the parking condition is detected, detect the parking space as a first parking space; and when information of selecting a second parking space other than the first parking space is input, change the predefined parking condition and detect the parking space satisfying the changed parking condition as the first parking space.

15. A parking assist apparatus comprising a control device, the control device being configured to:

execute a detection process of detecting a parking space around a vehicle that satisfies a predefined parking condition using a camera or ranging device provided at the vehicle or an external server;

when the parking space satisfying the parking condition is detected, detect the parking space as a first parking space; and when information of selecting a second parking space other than the first parking space is input, change the predefined parking condition and detect the parking space satisfying the changed parking condition as the first parking space.

* * * * *